(12) United States Patent
Kim et al.

(10) Patent No.: US 12,195,656 B2
(45) Date of Patent: Jan. 14, 2025

(54) LUMINESCENT NANOSTRUCTURE, AND COLOR CONVERSION PANEL AND ELECTRONIC DEVICE INCLUDING THE SAME

(71) Applicant: SAMSUNG ELECTRONICS CO., LTD., Suwon-si (KR)

(72) Inventors: Tae Gon Kim, Hwaseong-si (KR); Hyeyeon Yang, Suwon-si (KR); A Ra Jo, Suwon-si (KR); Sue In Chae, Suwon-si (KR); Sung Jun Park, Hwaseong-si (KR); Hyokeun Park, Hwaseong-si (KR); Shin Ae Jun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 421 days.

(21) Appl. No.: 17/687,453

(22) Filed: Mar. 4, 2022

(65) Prior Publication Data

US 2022/0282153 A1    Sep. 8, 2022

(30) Foreign Application Priority Data

Mar. 5, 2021 (KR) .................. 10-2021-0029748

(51) Int. Cl.
*C09K 11/88* (2006.01)
*C09D 11/037* (2014.01)
(Continued)

(52) U.S. Cl.
CPC .......... *C09K 11/883* (2013.01); *C09D 11/037* (2013.01); *C09D 11/50* (2013.01);
(Continued)

(58) Field of Classification Search
CPC .............. C09K 11/883; C09K 11/0883; C09K 11/0811; C09K 11/02; C09K 11/7492;
(Continued)

(56) References Cited

U.S. PATENT DOCUMENTS 10,074,770 B2   9/2018  Park et al.
10,559,712 B2   2/2020  Park et al.
(Continued)

FOREIGN PATENT DOCUMENTS

KR    20170074585 A   6/2017
KR      101859173 B1   5/2018
(Continued)

OTHER PUBLICATIONS

Jung-Ho, Jo "InP-Based Quantum Dots Having an InP Core, Composition-Gradient ZnSeS Inner Shell, and ZnS Outer Shell with Sharp, Bright Emissivity, and Blue Absorptivity for Display Devices," ACS Appl. Nano Mater. 2020, 3, pp. 1972-1980.
(Continued)

*Primary Examiner* — David E Smith
*Assistant Examiner* — Hsien C Tsai
(74) *Attorney, Agent, or Firm* — CANTOR COLBURN LLP

(57) ABSTRACT

A color conversion panel that includes a color conversion layer including two or more color conversion regions, and optionally, a partition wall defining the regions of the color conversion layer, and a display device including the color conversion panel. The color conversion region includes a first region corresponding to a first pixel, and the first region includes a first composite including a matrix and a plurality of luminescent nanostructures dispersed in the matrix. The luminescent nanostructures include a first semiconductor nanocrystal including a Group III-V compound and a second semiconductor nanocrystal including a zinc chalcogenide.

(Continued)

The Group III-V compound includes indium, phosphorus, and optionally, zinc or gallium, or zinc and gallium, and the zinc chalcogenide includes zinc, selenium, and sulfur. The luminescent nanostructures further include aluminum and chlorine, and a mole ratio of aluminum to sulfur (Al:S) is less than about 0.15:1, a mole ratio of chlorine to sulfur (Cl:S) is less than about 0.1:1, and a mole ratio of sulfur to selenium (S:Se) is greater than or equal to about 2:1. The luminescent nanostructures don not include cadmium.

20 Claims, 12 Drawing Sheets

(51) Int. Cl.
| | | |
|---|---|---|
| *C09D 11/50* | (2014.01) | |
| *C09K 11/08* | (2006.01) | |
| *G02F 1/1335* | (2006.01) | |
| *B82Y 20/00* | (2011.01) | |
| *B82Y 40/00* | (2011.01) | |

(52) U.S. Cl.
CPC .... *C09K 11/0883* (2013.01); *G02F 1/133614* (2021.01); *B82Y 20/00* (2013.01); *B82Y 40/00* (2013.01); *G02F 2202/107* (2013.01); *G02F 2202/36* (2013.01)

(58) Field of Classification Search
CPC ..... C09K 11/565; C09K 11/703; C09K 11/70; C09K 11/025; C09D 11/037; C09D 11/50; G02F 1/133614; G02F 1/01791
See application file for complete search history.

(56) References Cited

U.S. PATENT DOCUMENTS

| | | |
|---|---|---|
| 11,011,672 B2 | 5/2021 | Park et al. |
| 11,091,690 B2 | 8/2021 | Kwon et al. |
| 11,254,863 B2 | 2/2022 | Kim et al. |
| 11,332,666 B2 * | 5/2022 | Ahn .................. C01G 9/08 |
| 2020/0174288 A1 | 6/2020 | Kim et al. |
| 2021/0013382 A1 | 1/2021 | Hong et al. |
| 2021/0371734 A1 | 12/2021 | Kwon et al. |

FOREIGN PATENT DOCUMENTS

| | | |
|---|---|---|
| KR | 1020180052170 A | 5/2018 |
| KR | 20190138532 A | 12/2019 |
| KR | 102108373 B1 | 5/2020 |
| KR | 20200064946 A | 6/2020 |
| KR | 20200100011 A | 8/2020 |

OTHER PUBLICATIONS

Wang, Hung Chia, "Cadmium-Free InP/ZnSeS/ZnS Heterostructure-Based Quantum Dot Light-Emitting Diodes with a ZnMgO ElectronTransport Layer and a Brightness of Over 10 000 cd m-2," Advanced Science News, Small 2017 (7 pages).

* cited by examiner

Pattern Preparation by using a photoresist

Repeating the Patterning Process three times

LUMINESCENT NANOSTRUCTURE, AND COLOR CONVERSION PANEL AND ELECTRONIC DEVICE INCLUDING THE SAME

CROSS-REFERENCE TO RELATED APPLICATION

This application claims priority to Korean Patent Application No. 10-2021-0029748, filed in the Korean Intellectual Property Office on Mar. 5, 2021, and all the benefits accruing therefrom under 35 U.S.C. § 119, the content of which in its entirety is herein incorporated by reference.

BACKGROUND

1. Field

A luminescent nanostructure, a method for making the luminescent nanostructure, and a color conversion panel and an electronic device (e.g., a display panel) including the same are disclosed.

2. Description of the Related Art

A nanostructure may exhibit different aspects, characteristics, or properties than a corresponding bulk material having substantially the same composition, for example in terms of some of its physical properties (e.g., a bandgap energy, a luminescent property, and the like), which are known to be intrinsic to the bulk material. Luminescent nanostructure(s) may be configured to emit light on excitation by energy such as an incident light or an applied voltage. The luminescent nanostructure may find applicability in a variety of devices (e.g., a display panel or an electronic device including the display panel). There remains strong interest to developing luminescent nanostructures that do not include a toxic heavy metal such as cadmium, and yet, capable of exhibiting improved luminescent properties or performance.

SUMMARY

An embodiment provides a color conversion panel including a luminescent nanostructure(s) that may exhibit improved optical properties (e.g., a luminous efficiency, an incident light absorption, etc.) and enhanced (chemical and/or thermal) stability.

An embodiment provides a method of producing the luminescent nanostructure(s).

An embodiment provides a nanostructure population including the luminescent nanostructures.

An embodiment provides a composition (e.g., an ink composition) including the luminescent nanostructure(s).

An embodiment provides an electronic device (e.g., a display device) including the luminescent nanostructure or the color conversion panel.

In an embodiment, a color conversion panel includes a color conversion layer including a color conversion region, and optionally, a partition wall defining each region of the color conversion layer, the color conversion region includes a first region corresponding to a green pixel, and the first region includes a first composite that is configured to emit a green light and includes a matrix and a plurality of luminescent nanostructures dispersed in the matrix, wherein the plurality of luminescent nanostructures includes a first semiconductor nanocrystal including a Group III-V compound and a second semiconductor nanocrystal including a zinc chalcogenide, wherein the Group III-V compound includes indium, phosphorus, and optionally, zinc or gallium, or zinc and gallium, wherein the zinc chalcogenide includes zinc, selenium, and sulfur, wherein the luminescent nanostructures do not include cadmium, and wherein the luminescent nanostructures further include aluminum and chlorine, and wherein in the luminescent nanostructures, a mole ratio of aluminum to sulfur (Al:S) is less than about 0.15:1, a mole ratio of chlorine to sulfur (Cl:S) is less than about 0.1:1, and a mole ratio of sulfur to selenium (S:Se) is greater than or equal to about 2:1. The luminescent nanostructures may be configured to emit green light on excitation (e.g., irradiation of incident light).

A full width at half maximum of a maximum luminescent peak of the green light (or the luminescent nanostructure) may be less than or equal to about 42 nm.

A maximum luminescent peak wavelength of the green light (or the luminescent nanostructures) may be greater than or equal to about 500 nm, or greater than or equal to about 505 nm. The maximum luminescent peak of the green light (or the luminescent nanostructures) may be less than or equal to about 550 nm, less than or equal to about 530 nm, less than or equal to about 525 nm, less than or equal to about 520 nm, less than or equal to about 515 nm, or less than or equal to about 510 nm.

The luminescent nanostructure may exhibit an ultraviolet-visible absorption spectrum curve that has a positive differential coefficient value (i.e., tangential slope) at 450 nm.

The differential coefficient value may be greater than zero, or greater than or equal to about 0.001.

In an UV-Vis absorption spectrum of the luminescent nanostructure, a valley depth (VD) defined by the following equation may be greater than or equal to about 0.2, greater than or equal to about 0.3, greater than or equal to about 0.35, or greater than or equal to about 0.4:

$$1-(Abs_{valley}/Abs_{first})=VD$$

wherein, $Abs_{first}$ is an absorption rate at the first absorption peak, and $Abs_{valley}$ is an absorption rate at the lowest point of the valley adjacent to the first absorption peak.

In the luminescent nanostructures, a mole ratio of sulfur to selenium (S:Se) may be greater than or equal to about 2.1:1, greater than or equal to about 2.2:1, greater than or equal to about 2.3:1, greater than or equal to about 2.4:1, or greater than or equal to about 2.5:1.

In the luminescent nanostructures, a mole ratio of sulfur to selenium may be less than or equal to about 3.5:1, less than or equal to about 3.4:1, less than or equal to about 3.3:1, less than or equal to about 3.2:1, or less than or equal to about 3.1:1.

In the luminescent nanostructures, a mole ratio of sulfur to indium may be greater than or equal to about 3:1, greater than or equal to about 5:1, greater than or equal to about 7:1, or greater than or equal to about 9:1.

In the luminescent nanostructures, a mole ratio of sulfur to indium may be less than or equal to about 20:1, less than or equal to about 17:1, or less than or equal to about 15:1.

In the luminescent nanostructures, a mole ratio of selenium to indium may be less than or equal to about 10:1, less than or equal to about 8:1, or less than or equal to about 6:1. The mole ratio of selenium to indium may be greater than or equal to about 1:1, greater than or equal to about 2:1, or greater than or equal to about 3:1.

In the luminescent nanostructures, a mole ratio of zinc to indium may be less than or equal to about 30:1, less than or equal to about 24:1, less than or equal to about 23:1, less than or equal to about 22:1, less than or equal to about 21:1, less than or equal to about 20:1, less than or equal to about 19:1, less than or equal to about 18:1, or less than or equal to about 17:1. The mole ratio of zinc to indium may be greater than or equal to about 5:1, greater than or equal to about 10:1, greater than or equal to about 15:1, or greater than or equal to about 17:1.

In the luminescent nanostructures, a mole ratio of phosphorus to indium may be greater than or equal to about 0.85:1, greater than or equal to about 0.88:1, greater than or equal to about 0.89:1, greater than or equal to about 0.9:1, greater than or equal to about 0.93:1, or greater than or equal to about 0.95:1.

In the luminescent nanostructures, a mole ratio of phosphorus to indium may be greater than or equal to about 1.5:1, less than or equal to about 1.4:1, less than or equal to about 1.3:1, less than or equal to about 1.2:1, less than or equal to about 1.1:1, or less than or equal to about 1.05:1.

In the luminescent nanostructures, a mole ratio of aluminum to sulfur may be greater than or equal to about 0.005:1. In the luminescent nanostructures, a mole ratio of aluminum to sulfur may be less than or equal to about 0.12:1.

In the luminescent nanostructures, a mole ratio of chlorine to sulfur may be less than about 0.8:1.

The first composite may be prepared by a thermal treatment at a temperature of about 180° C. for about 30 minutes in a form of a film having a thickness of greater than or equal to about 6 micrometers (μm), e.g., 10 μm or greater. In the first composite, an amount of the luminescent nanostructures may be less than or equal to about 45 weight percent (wt %) e.g., about 43 wt %, based on a total weight of the first composite.

The first composite may exhibit a light conversion efficiency of greater than or equal to about 35%, or greater than or equal to about 38%, as defined by the following equation:

$$[A/(B-B')] \times 100 = \text{light conversion efficiency (\%)}$$

A: light dose of the first light
B: light dose of an incident light
B': light dose having passed through the first composite The first composite may have an incident light absorption of greater than or equal to about 84%:

$$(B-B')/B \times 100 = \text{incident light absorption (\%)}$$

B and B' are the same as defined above

A maximum luminescent peak wavelength of the incident light may be in a range of greater than or equal to about 450 nm, greater than or equal to about 460 nm and less than or equal to about 470 nm or less than or equal to about 460 nm, e.g., about 458 nm.

The first composite may show a loss percentage between a luminous efficiency (QY) at 30° C. and a luminous efficiency (QY) at about 80° C., (hereinafter, QY loss) that is less than or equal to about 11%, or less than or equal to about 10% at the irradiation of incident light of a wavelength of about 450 nm to about 460 nm:

$$QY \text{ loss (\%)} = [1-(QY \text{ at } 80° C./QY \text{ at } 30° C.)] \times 100.$$

As the first composite is irradiated with an incident light of a wavelength of about 458 nm, a tail percentage defined by the following equation may be less than or equal to about 15%:

$$A \text{ tail percentage (\%)} = [S2/S1] \times 100$$

S1: a total area of a maximum photoluminescent peak of the first composite (or the green light)
S2: an area of the maximum photoluminescent peak of the first composite (or the green light) in a wavelength region of greater than or equal to about 580 nm.

An average size of the first semiconductor nanocrystal may be greater than or equal to about 1.5 nm. An average size of the first semiconductor nanocrystal may be less than or equal to about 2.5 nm.

A quantum efficiency (e.g., an absolute quantum yield) of the luminescent nanostructures may be greater than or equal to about 81%, greater than or equal to about 82%, greater than or equal to about 83%, greater than or equal to about 84%, greater than or equal to about 85%, greater than or equal to about 86%, greater than or equal to about 87%, greater than or equal to about 88%, greater than or equal to about 89%, or greater than or equal to about 90%.

The luminescent nanostructures may include a C10 or higher (e.g., C10 to C40) aliphatic carboxylic acid bound to surfaces thereof. In an evolved gas analysis for the luminescent nanostructures, a mole ratio of an aliphatic carboxylic acid detected at a temperature of greater than or equal to about 350° C. may be greater than or equal to about 0.85:1, greater than or equal to about 0.88:1, or greater than or equal to about 0.90:1.

In a time resolved photoluminescent spectroscopy analysis of the luminescent nanostructures, a percentage ratio of a maximum peak intensity of a trap emission defined with 60 nanoseconds (ns) to a maximum peak intensity of a band-edge emission defined with 30 ns may be less than or equal to about 43%, less than or equal to about 40%, less than or equal to about 38%, less than or equal to about 37%, or less than or equal to about 36%.

The plurality of the luminescent nanostructures may have a core shell structure including a core and a shell (e.g., a single shell) disposed on the core. The core may include the first semiconductor nanocrystal.

In an embodiment, the shell (e.g., the single shell) may include the second semiconductor nanocrystal.

The second semiconductor nanocrystal or the shell may have a thickness of less than or equal to about 6 monolayers. In an embodiment, the shell may be a multi-layered shell including at least two shell layers wherein adjacent shell layers may have different composition from one another. The multi-layered shell may include a first shell layer including zinc, selenium, and optionally, sulfur; and a second shell layer being disposed on the first shell layer, the second layer including zinc and sulfur. The first shell layer may be disposed on (e.g., directly on) the first semiconductor (or the core). The second shell layer may be disposed on (e.g., directly on) the first shell layer. The second shell layer may be an outermost inorganic layer of the luminescent nanostructure.

A thickness of the first shell layer may be less than or equal to about 4 monolayers (ML), or less than or equal to about 3.5 ML. A thickness of the first shell layer may be 1 ML, greater than or equal to about 1.5 ML, greater than or equal to about 2 ML, greater than or equal to about 2.5 ML, or greater than or equal to about 3 ML. A thickness of the second shell layer may be less than or equal to about 1 nm, less than or equal to about 0.9 nm, less than or equal to about 0.8 nm, less than or equal to about 0.7 nm, or less than or equal to about 0.6 nm. A thickness of the second shell layer may be greater than or equal to about 0.3 nm, or greater than or equal to about 0.5 nm.

The luminescent nanostructures may emit light having a maximum luminescent peak with a full width at half maximum of greater than or equal to about 40 nm, as a dispersion in an organic solvent. The luminescent nanostructures may emit light having a maximum luminescent peak with a full width at half maximum of less than or equal to about 50 nm, as a dispersion in an organic solvent.

The luminescent nanostructures may have an average particle size of less than or equal to about 6.5 nm, less than or equal to about 5.5 nm, less than or equal to about 5 nm, less than or equal to about 4.7 nm, or less than or equal to about 4.5 nm, as determined by an electronic microscope.

The polymer matrix may include a linear polymer, a crosslinked polymer, or a combination thereof.

The crosslinked polymer may include a thiolene polymer, a crosslinked poly(meth)acrylate, a crosslinked polyurethane, a crosslinked epoxy resin, a crosslinked vinyl polymer, a crosslinked silicone resin, or a combination thereof.

The linear polymer may include a repeating unit derived from carbon-carbon unsaturated bonds (e.g., carbon-carbon double bond). The repeating unit may include a carboxylic acid group. The linear polymer may include an ethylene repeating unit.

The carboxylic acid group-containing repeating unit may include a unit derived from a monomer including a carboxylic acid group and a carbon-carbon double bond, a unit derived from a monomer having a dianhydride moiety, or a combination thereof.

The polymer matrix may include a carboxylic acid group-containing compound (e.g., a binder, a binder polymer, or a dispersing agent) (for example, for dispersing a quantum dot or acting as a binder).

The carboxylic acid group-containing compound may include
- a monomer combination including a first monomer including a carboxylic acid group and a carbon-carbon double bond, a second monomer having a carbon-carbon double bond and a hydrophobic moiety, and a second monomer not including a carboxylic acid group, and optionally, a third monomer including a carbon-carbon double bond and a hydrophilic moiety and not including a carboxylic acid group, or a copolymer thereof;
- a multiple aromatic ring-containing polymer having a backbone structure where two aromatic rings are bound to a quaternary carbon atom that is a constituent atom of another cyclic moiety in the main chain and including a carboxylic acid group (—COOH);
- or a combination thereof.

The (polymer) matrix may further include a polymerized product of a monomer combination including a (polyfunctional or monofunctional) thiol compound (e.g., mono- or multi-thiol compound) having at least one thiol group at the terminal end and an ene compound having a carbon-carbon unsaturated bond, a metal oxide fine particle, or a combination thereof.

The first composite may have a form of a patterned film.

An embodiment is related to a nanostructure population including a plurality of (e.g., cadmium-free) luminescent nanostructures described herein.

In an embodiment, an ink composition includes a liquid vehicle and a population of the plurality of luminescent nanostructures described herein. The plurality of luminescent nanostructures may be dispersed in the liquid vehicle.

The liquid vehicle may include a liquid monomer, an organic solvent, or a combination thereof.

The ink composition or the first composite may further include metal oxide fine particles.

The ink composition may further include a dispersing agent for dispersing the luminescent nanostructures, the metal oxide fine particles, or a combination thereof.

The dispersing agent may include a carboxylic acid group containing organic compound (e.g., monomer or polymer).

In an embodiment, a display panel includes a light emitting panel (or a light source), the color conversion panel described herein, and a light transmitting layer disposed between the light emitting panel and the color conversion panel.

The light emitting panel (or the light source) may be configured to provide the color conversion panel with incident light. The incident light may include blue light, and optionally, green light, for example, to provide a mix of blue and green incident light. The blue light may have a luminescent peak wavelength in a range of from about 440 nm to about 460 nm or from about 450 nm to about 455 nm.

In an embodiment, an electronic device (or a display device) may include the color conversion panel or the display panel.

The luminescent nanostructures of an embodiment may exhibit improved optical properties (e.g., improved blue light absorption rate and/or luminous efficiency) as well as enhanced (chemical and/or thermal) stability. The luminescent nanostructures of an embodiment may be configured to emit light (e.g., green light) with an improved efficiency and/or a more narrowed full width at half maximum with a suppressed tail emission even as the luminescent nanostructures are included in a form of a composite. The luminescent nanostructures of an embodiment may address problems of a decreasing luminous efficiency over time resulting from the operation of a device.

In an embodiment, the color conversion panel may be used with a variety of light sources and may be used in a liquid crystal display device, a QD-OLED device, a QD micro LED display device including a QD color filter and a (blue) micro LED, or the like. The luminescent nanostructures and the color conversion panel of the embodiments may find their use in many devices such as a television set, a monitor, a mobile equipment, a virtual reality or augmented reality device, an automotive application display, a mobile phone, a television, a computer display, or the like.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
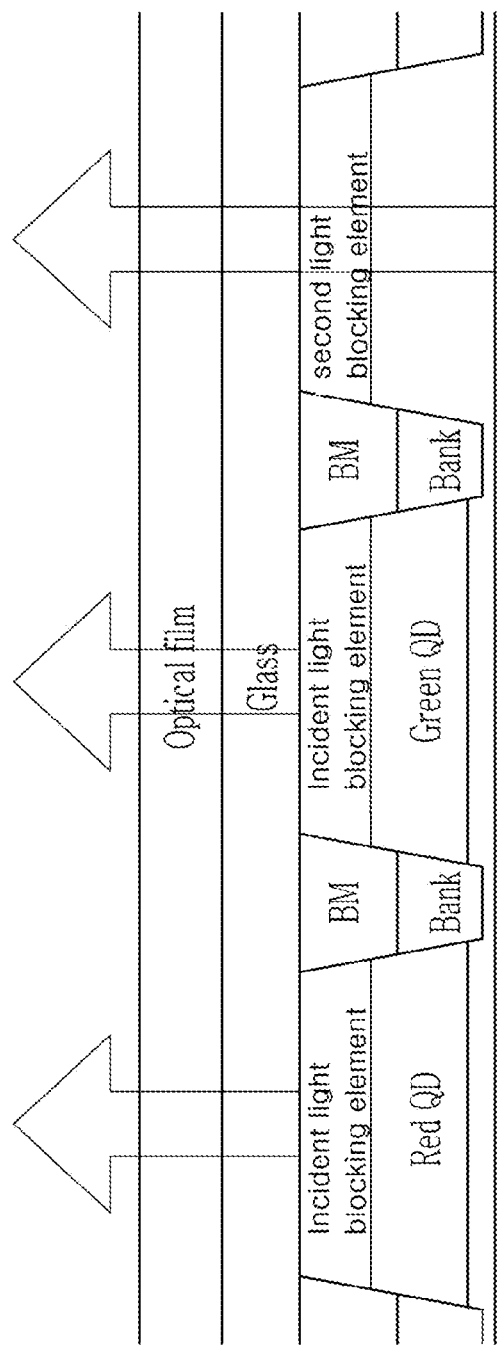
FIG. 1 is a schematic cross-sectional view of a color conversion panel according to an embodiment.

Advantages and characteristics of this disclosure, and a method for achieving the same, will become evident referring to the following example embodiments together with the drawings attached hereto. However, the embodiments should not be construed as being limited to the embodiments set forth herein. Rather, these embodiments are provided so that this disclosure will be thorough and complete, and will fully convey the scope of the invention to those skilled in the art. Like reference numerals refer to like elements throughout.

If not defined otherwise, all terms (including technical and scientific terms) in the specification may be defined as commonly understood by one skilled in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the expression "not including cadmium (or other harmful heavy metal)" may refer to the case in which a concentration of cadmium (or other harmful heavy metal) may be less than or equal to about 100 parts per million by weight (ppmw), less than or equal to about 50 ppmw, less than or equal to about 10 ppmw, less than or equal to about 1 ppmw, less than or equal to about 0.1 ppmw, less than or equal to about 0.01 ppmw, or about zero. In an embodiment, substantially no amount of cadmium (or other harmful heavy metal) may be present or, if present, an amount of cadmium (or other harmful heavy metal) may be less than or equal to a detection limit or as an impurity level of a given analysis tool (e.g., an inductively coupled plasma atomic emission spectroscopy).

As used herein, unless a definition is otherwise provided, the term "substituted" refers to a compound or a group or a moiety wherein a, e.g., at least one, hydrogen atom thereof is substituted with a substituent. The substituent may include a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C40 heteroaryl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group or amine group (—NRR', wherein R and R' are the same or different, and are independently hydrogen or a C1 to C6 alkyl group), an azido group (—N$_3$), an amidino group (—O(=NH)NH$_2$), a hydrazino group (—NHNH$_2$), a hydrazono group (=N (NH$_2$)), an aldehyde group (—O(=O)H), a carbamoyl group (—C(O)NH$_2$), a thiol group (—SH), an ester group (—O(=O)OR, wherein R is a C1 to C6 alkyl group or a C6 to C12 aryl group), a carboxylic acid group (—COOH) or a salt thereof (—O(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

As used herein, unless a definition is otherwise provided, the term "hetero" refers to a compound, group, or substituent including at least one (e.g., one to three) heteroatom(s), wherein the heteroatom(s) is each independently N, O, S, Si, P, or a combination thereof.

As used herein, unless a definition is otherwise provided, the term "aliphatic hydrocarbon" refers to a C1 to C30 linear or branched alkyl group, a C2 to C30 linear or branched alkenyl group, or a C2 to C30 linear or branched alkynyl group.

As used herein, unless a definition is otherwise provided, the term "aromatic" or "aromatic hydrocarbon group" refers to a moiety having at least one aromatic ring, optionally together with one or more nonaromatic rings, formed by the removal of one or more hydrogen atoms from one or more rings of an aromatic hydrocarbon, wherein the hydrogen atom(s) may be removed from the aromatic or, if present, nonaromatic ring. One or more heteroatoms, e.g., N, P, S, O, Si, or a combination thereof may be present in one or more rings. The aromatic hydrocarbon group may be optionally substituted with one or more substituents.

As used herein, unless a definition is otherwise provided, the term "aryl group" refers to a group containing one to five aromatic rings, having a valence of one and formed by the removal of a hydrogen atom from one ring. A "heteroaryl group" refers to an aryl group wherein at least one aromatic ring carbon atom, is replaced by a heteroatom, e.g., N, P, S, O, Si, or a combination thereof. The aryl and heteroaryl groups may be optionally substituted with one or more substituents. The aryl group can be a C6 to C30 aryl group and the heteroaryl group can be a C2 to C30 heteroaryl group.

As used herein, unless a definition is otherwise provided, the term "(meth)acrylate" refers to acrylate, methacrylate, or a combination thereof. The (meth)acrylate may include a (C1 to C10 alkyl) acrylate, a (C1 to C10 alkyl) methacrylate, or a combination thereof.

As used herein, the term "Group" may refer to a group of Periodic Table.

As used herein, "Group III" refers to Group IIIA and Group IIIB, and examples of Group III metal may be Al, In, Ga, and Tl, but are not limited thereto.

As used herein, "Group V" may refer to Group VA, and examples thereof may include nitrogen, phosphorus, arsenic, antimony, and bismuth, but are not limited thereto.

As used herein, a nanostructure is a structure having at least one region or characteristic dimension with a dimension of less than or equal to about 500 nm. In an embodiment, a dimension (or an average) of the nanostructure(s) is less than or equal to about 300 nm, less than or equal to about 250 nm, less than or equal to about 150 nm, less than or equal to about 100 nm, less than or equal to about 50 nm, or less than or equal to about 30 nm. In an embodiment, the structure may have any shape. The nanostructure may include a nanowire, a nanorod, a nanotube, a branched nanostructure, a nanotetrapod, a nanotripod, a nanobipod, a nanocrystal, a nanodot, a multi-pod type shape such as at least two pods, or the like and is not limited thereto. The nanostructure can be, e.g., substantially crystalline, substantially monocrystalline, polycrystalline, (for example, at least partially) amorphous, or a combination thereof.

As used herein, the term "quantum dot" refers to a nanostructure (for example, a semiconductor-based nanocrystal particle that exhibits quantum confinement or exciton confinement. The quantum dot is a type of light emitting nanostructure (for example capable of emitting light by an energy excitation). As used herein, unless defined otherwise, a shape of the "quantum dot" may not particularly limited.

In an embodiment, "dispersion" may refer to a system wherein a dispersed phase is a solid and a continuous phase includes a liquid or a solid different from the dispersed phase. In an embodiment, "dispersion" refers to a colloidal dispersion wherein the dispersed phase has a dimension of greater than or equal to about 1 nm, for example, greater than or equal to about 2 nm, greater than or equal to about 3 nm, or greater than or equal to about 4 nm and several micrometers (μm) or less, (e.g., less than or equal to about 2 μm, less than or equal to about 1 μm, less than or equal to about 900 nm, less than or equal to about 800 nm, less than or equal to about 700 nm, less than or equal to about 600 nm, or less than or equal to about 500 nm).

As used herein, the term "average" (e.g., an average size of the quantum dot) may be mean or median. In an embodiment, the average may be "mean" average.

In an embodiment, the quantum efficiency (which can be interchangeably used with the term "quantum yield") may be measured in a solution state or a solid state (in a composite). In an embodiment, the quantum efficiency may be a ratio of photons emitted to photons absorbed, e.g., by a nanostructure or population of nanostructures. In an embodiment, the quantum efficiency may be determined by any suitable method. For example, there may be two methods for measuring the fluorescence quantum yield or efficiency: the absolute method and the relative method. The absolute method directly obtains the quantum yield by detecting all sample fluorescence through the use of an integrating sphere. In the relative method, the fluorescence intensity of a standard sample (e.g., a standard dye) may be compared with the fluorescence intensity of an unknown sample to calculate the quantum yield of the unknown sample. Coumarin 153, Coumarin 545, Rhodamine 101 inner salt, Anthracene, and Rhodamine 6G may be used as standard dye, depending on the photoluminescence (PL) wavelengths, but are not limited thereto.

The quantum yield (QY) may be readily and reproducibly determined by using commercially available equipment, for example, from Hitachi Co. Ltd or Hamamatsu Co. Ltd and referring to the instruction manuals provided from the manufacturer.

The full width at half maximum (FWHM) and the maximum PL peak wavelength may be determined by a photoluminescent spectrum obtained by a spectrophotometer (or Fluorescence Spectrophotometer).

As used herein, "first absorption peak wavelength" refers to a wavelength of the first main peak appearing in the lowest energy region in an ultraviolet-visible absorption spectrum.

A luminescent nanostructure may be included in a variety of electronic devices. An electronic and/or an optical property of the nanostructure may be controlled by its characteristics such as the elemental composition, size and/or a shape or configuration of the nanostructure. In an embodiment, the luminescent nanostructure may include a semiconductor nanocrystal particle. The luminescent nanostructure (e.g., a quantum dot) may have a relatively large surface area per a unit volume, and thus, may show a quantum confinement effect, thereby exhibiting physical or optical properties different from a corresponding bulk material of the same composition. Therefore, a luminescent nanostructure such as a quantum dot may absorb energy (e.g., from incident light) supplied from an excitation source to form an excited state, which upon relaxation is capable of emitting an energy corresponding to its bandgap energy.

For a use in a color conversion panel (e.g., a luminescent color filter), it is desired for the luminescent nanostructures to have a relatively high luminous efficiency and/or an increased incident light absorption.

Currently, a majority of luminescent nanostructures exhibiting an optical property of a level of applicable to electronic devices such as for displays and having chemical and/or thermal stability are based on a cadmium compound (e.g., cadmium chalcogenide). However, cadmium raises serious environment/health problems and concerns, and is one of restricted elements, posing another limit the use of the luminescent nanostructures including the same.

To address this issue, the research and development of a cadmium-free, luminescent nanostructure, i.e., Group III-V-based nanocrystals, e.g., a Group III-V (e.g., indium phosphide) based, cadmium-free luminescent nanostructure has been quite extensive. Unfortunately, many of the cadmium-free luminescent structures developed to date tend to exhibit inferior stability (e.g., chemical stability and thermal stability) in comparison to the cadmium-based nanostructures. For example, many of the cadmium-free luminescent structures may exhibit a substantial deterioration in chemical and optical performance following process development of the nanostructures into a composite or a process step(s) for making an electronic device.

The luminescent nanostructure may use blue light as an excitation source, but according to the research of the present inventors, cadmium-free luminescent nanostructures (in particular, those emitting green light) tend to have a relatively low level of blue light absorption in comparison with the cadmium-based nanostructures. Therefore, it may be difficult for indium phosphide-based quantum dots to have a relatively high level of light absorption as well as a relatively high level of luminous efficiency.

In addition, a shell may be desired to have an increased thickness for a desired level of (chemical (oxidation) or thermal) stability, and/or an enhancement in a luminous property. However, an increase of the shell thickness may also result in a sharp increase in the weight of a single quantum dot, and this may lead to a decrease in the number of the quantum dots included in a given weight of a composite. According to the research of the present inventors, this may also result in a reduction of incident light absorption of the composite.

In addition, most (or almost all) of the indium phosphide based luminescent nanostructures that emit green light with a desired luminous efficiency may exhibit an absorption curve of decreasing absorbance with an increase of a wavelength, for example, in a blue light region of from about 450 nm to about 470 nm. The present inventors have identified that such a shape of the UV-Vis absorption spectrum may lead to a relatively sharp decrease in light absorption by the nanostructure composite, for example, when an OLED emitting light of a wavelength longer than 450 nm is used as a light source. Therefore, it is desired to develop a luminescent nanostructure that can maintain a relatively high level of the incident light absorption even if an OLED with wavelength longer than 450 nm is used as an incident light source In case of being applied as a patterned film such as a color filter, e.g., in a display, a decrease in excitation light absorption of the luminescent material may be a direct cause of blue light leakage in a display device, which may have an adverse effect on color reproducibility (e.g., DCI matching rate), and/or may cause a decrease in a luminous efficiency as the display device may have to use an absorption type color filter to prevent blue light leakage. A light scatterer may be included in the composite to try and address this problem, however, the presence of such a scatter may also cause an increase in external light reflection of the device.

An embodiment provides a luminescent nanostructure(s) (e.g., quantum dot(s)) having the structures and composition described herein, whereby the luminescent nanostructures of an embodiment may exhibit improved optical properties (e.g., a luminous efficiency) as well as a desired level of chemical and/or thermal stability, even in the absence of cadmium. The cadmium-free luminescent nanostructures of an embodiment, even if such nanostructures are provided in a form of a composite, may exhibit an increased level of (incident light) absorption as well as achieving one or more desirable optical properties (including a narrower full width at half maximum and/or a decreased tail emission percentage for a light source emitting light of a wavelength of greater than or equal to about 450 nm and less than or equal to about 470 nm (e.g., 458 nm).

In an embodiment, the color conversion panel include a color conversion layer having a color conversion region (e.g., two or more color conversion regions). FIG. 1 is a schematic view of a color conversion panel of an embodiment. Referring to FIG. 1, the color conversion panel may further include a partition wall (e.g., a black matrix, a bank, or a combination thereof) to define each region of the color conversion layer. The color conversion layer may be a patterned film of a composite including luminescent nanostructures. The color conversion region may include a first region(s) (e.g., receiving the incident light) and being configured to emit a first light (e.g., green light). The first region(s) may be arranged to correspond to a green pixel. The first region may include the first (luminescent) composite. In an embodiment, the first composite may include a matrix (e.g., a polymer matrix) and a plurality of luminescent nanostructures (hereinafter, simply referred to as "nanostructure" at times) dispersed in the matrix. The first composite (or the first region) may be configured to emit a first light. The first light may be green light. The luminescent nanostructures included therein may be configured to emit green light on excitation (or when being provided with an incident light).

A maximum luminescent peak wavelength of the green light (or the luminescent nanostructure) may be greater than or equal to about 500 nm, greater than or equal to about 501 nm, greater than or equal to about 504 nm, or greater than or equal to about 505 nm. A maximum luminescent peak wavelength of the green light (or the luminescent nanostructure) may be less than or equal to about 550 nm, less than or equal to about 540 nm, less than or equal to about 535 nm, less than or equal to about 530 nm, less than or equal to about 525 nm, less than or equal to about 520 nm, less than or equal to about 515 nm, or less than or equal to about 510 nm.

The color conversion region may further include a second region(s) that is configured to emit light of a different color from the first light (e.g., to emit red light). The second region may include a second (luminescent) composite.

The luminescent composite disposed in the second region may include a matrix and luminescent nanostructures dispersed in the matrix and being configured to emit light of a different color (e.g., red light) from the first composite disposed in the first region.

The first light or the second light may be red light having a maximum luminescent peak wavelength of from about 600 nm to about 650 nm (for example, from about 620 nm to about 650 nm). The first light or the second light may be red light having a maximum luminescent peak wavelength of from about 500 nm to about 550 nm (for example, from about 510 nm to about 540 nm).

The color conversion panel may further include a third region(s) (for example, including a third composite) that may emit or pass blue light. A maximum luminescent peak wavelength of the blue light may be the same as set forth herein. In an embodiment, a maximum luminescent peak wavelength of the blue light may be greater than or equal to about 380 nm (for example, greater than or equal to about 440 nm, greater than or equal to about 445 nm, greater than or equal to about 450 nm, greater than or equal to about 455 nm), and less than or equal to about 480 nm (less than or equal to about 475 nm, less than or equal to about 470 nm, less than or equal to about 465 nm, less than or equal to about 460 nm.

In an embodiment, the luminescent nanostructures included in the first composite may include a first semiconductor nanocrystal including a Group III-V compound and a second semiconductor nanocrystal including a zinc chalcogenide. The nanostructures (or each of them) may have a core shell structure including a core and a shell disposed on the core. The core may include the first semiconductor nanocrystal. The shell may include the second semiconductor nanocrystal. The luminescent nanostructures may not include cadmium. The luminescent nanostructures may not include cadmium, lead, mercury, or a combination thereof.

The Group III-V compound includes indium and phosphorus. The Group III-V compound may optionally include zinc, gallium, or a combination thereof (e.g., zinc and gallium). The Group III-V compound may include zinc. The Group III-V compound may include an indium phosphide, an indium gallium phosphide, an indium zinc phosphide, an indium zinc gallium phosphide, or a combination thereof.

The first semiconductor nanocrystal or the core may be an emissive center of the luminescent nanostructure. A size of the first semiconductor nanocrystal or the core may be selected taking into account a desired maximum luminescent peak wavelength of the luminescent nanostructure. In an embodiment, the first semiconductor nanocrystal or the core may have a size (or an average size) of greater than or equal to about 1 nm, greater than or equal to about 1.5 nm, greater than or equal to about 1.8 nm, or greater than or equal to about 2 nm. In an embodiment, the first semiconductor nanocrystal or the core may have a size (or an average size) of less than or equal to about 5 nm, less than or equal to about 4.5 nm, less than or equal to about 4 nm, less than or equal to about 3.8 nm, less than or equal to about 3.5 nm, or less than or equal to about 2.5 nm.

The second semiconductor nanocrystal or the shell may be disposed on the core. The zinc chalcogenide may include zinc, selenium, and sulfur. The zinc chalcogenide may include ZnSe, ZnSeS, ZnS, or a combination thereof. The second semiconductor nanocrystal may include a zinc selenide sulfide. The second semiconductor nanocrystal may include a combination of a first zinc chalcogenide including a zinc selenide and a second zinc chalcogenide including a zinc sulfide.

A thickness of the second semiconductor nanocrystal or the shell may be less than or equal to about 6 monolayers (hereinafter, ML), less than or equal to about 5.5 ML, less than or equal to about 5 ML, less than or equal to about 4.5 ML, less than or equal to about 4 ML, less than or equal to about 3.5 ML, or less than or equal to about 3 ML. A thickness of the second semiconductor nanocrystal or the shell may be greater than or equal to about 2 ML, greater than or equal to about 2.5 ML, greater than or equal to about 3 ML, or greater than or equal to about 3.5 ML.

The thickness of the second semiconductor nanocrystal or the shell may be less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.55 nm, less than or equal to about 1.5 nm, less than or equal to about 1.45 nm, or less than or equal to about 1.4 nm. The thickness of the second semiconductor nanocrystal or the shell may be greater than or equal to about 0.5 nm, greater than or equal to about 0.6 nm, greater than or equal to about 0.7 nm, greater than or equal to about 0.8 nm, greater than or equal to about 0.9 nm, or greater than or equal to about 1 nm.

In an embodiment, the shell may be a multi-layered shell including at least two shell layers wherein adjacent shell layers may have different composition from one another. The multi-layered shell may include a first shell layer including zinc, selenium, and optionally sulfur; and a second layer being disposed on the first layer, the second layer including zinc, sulfur, and optionally, selenium. The second shell layer may include the sulfur in a greater amount (e.g., mole) than the first shell layer. The first shell layer or the second shell layer may include ZnSe, ZnS, ZnSeS, or a combination thereof. The first shell layer may be disposed on (e.g., directly on) the semiconductor nanocrystal core. The second shell layer may be disposed (e.g., directly on) the first shell layer. The second shell layer may be an outermost layer of the luminescent nanostructure.

In an embodiment, the shell may be a single shell including the second semiconductor nanocrystal. The single shell may have a composition varying with a radial direction. In an embodiment, a concentration of the sulfur in the shell may increase toward a surface of the luminescent nanostructure. An outermost surface of the nanostructure may include zinc, selenium, and sulfur.

In an embodiment, a nanostructure having a "single shell" may be a nanostructure that includes a core (i.e., a first semiconductor nanocrystal), and a shell disposed over a surface of the core and having substantially a single composition including a homogeneous alloy or a gradient alloy for example of at least three elements, for example, in a thickness direction. In the single shell, a portion or a layer of the shell directly on or contacting the core may include zinc, selenium, and sulfur. In an embodiment, the shell may have a gradient concentration of the different elements for example, provided by shell precursors described herein. In an embodiment, the single shell may have an amount of one element, e.g., sulfur, that increases in concentration from the core surface to an outer most surface of the luminescent nanostructure.

A thickness of the first shell layer may be less than or equal to about 6 monolayers (ML), less than or equal to about 5 ML, less than or equal to about 4 ML, less than or equal to about 3.5 ML, or less than or equal to about 3 ML. A thickness of the first shell layer may be greater than or equal to about 0.5 ML, greater than or equal to about 1 ML, greater than or equal to about 1.5 ML, greater than or equal to about 2 ML, or greater than or equal to about 2.5 ML, and less than or equal to about 5 ML, less than or equal to about 4 ML, less than or equal to about 3 ML, less than or equal to about 2.5 ML, less than or equal to about 2 ML, or less than or equal to about 1.5 ML. A thickness of the second shell layer may be greater than or equal to about 0.1 nm, greater than or equal to about 0.2 nm, or greater than or equal to about 0.3 nm. A thickness of the second shell layer may be less than or equal to about 1 nm, less than or equal to about 0.9 nm, less than or equal to about 0.8 nm, less than or equal to about 0.7 nm, or less than or equal to about 0.6 nm. A thickness of the second shell layer may be greater than or equal to about 0.5 ML, greater than or equal to about 1 ML, greater than or equal to about 1.5 ML, greater than or equal to about 2 ML, or greater than or equal to about 2.5 ML, and less than or equal to about 5 ML, less than or equal to about 4 ML, less than or equal to about 3 ML, less than or equal to about 2.5 ML, less than or equal to about 2 ML, or less than or equal to about 1.5 ML.

In the luminescent nanostructures of an embodiment, a mole ratio of sulfur to selenium (S:Se) may be greater than or equal to about 2:1. The mole ratio of sulfur to selenium may be greater than or equal to about 2.1:1, greater than or equal to about 2.2:1, greater than or equal to about 2.3:1, greater than or equal to about 2.4:1, greater than or equal to about 2.5:1, greater than or equal to about 2.52:1, greater than or equal to about 2.55:1, greater than or equal to about 2.6:1, greater than or equal to about 2.62:1, greater than or equal to about 2.65:1, or greater than or equal to about 2.7:1. In the luminescent nanostructures of an embodiment, a mole ratio of sulfur to selenium may be less than or equal to about 4:1, less than or equal to about 3.7:1, less than or equal to about 3.5:1, less than or equal to about 3.4:1, less than or equal to about 3.3:1, less than or equal to about 3.2:1, less than or equal to about 3.1:1, less than or equal to about 3:1, less than or equal to about 2.9:1, less than or equal to about 2.8:1, less than or equal to about 2.7:1, less than or equal to about 2.6:1, less than or equal to about 2.5:1, less than or equal to about 2.4:1, less than or equal to about 2.3:1, less than or equal to about 2.2:1, or less than or equal to about 2.1:1.

In the luminescent nanostructures of an embodiment, a mole ratio of sulfur to indium (S:In) may be greater than or equal to about 3:1, greater than or equal to about 3.5:1, greater than or equal to about 4:1, greater than or equal to about 4.5:1, greater than or equal to about 5:1, greater than or equal to about 5.5:1, greater than or equal to about 6:1, greater than or equal to about 6.5:1, greater than or equal to about 7:1, greater than or equal to about 7.5:1, greater than or equal to about 8:1, greater than or equal to about 8.5:1, greater than or equal to about 9:1, greater than or equal to about 9.5:1, or greater than or equal to about 10:1. In the luminescent nanostructures of an embodiment, a mole ratio of sulfur to indium (S:In) may be less than or equal to about 20:1, less than or equal to about 19:1, less than or equal to about 18:1, less than or equal to about 17:1, less than or equal to about 16:1, less than or equal to about 15:1, less than or equal to about 14.5:1, less than or equal to about 14:1, less than or equal to about 13.5:1, less than or equal to about 13:1, less than or equal to about 12.5:1, less than or equal to about 12:1, or less than or equal to about 11.5:1.

In the luminescent nanostructures of an embodiment, a mole ratio of selenium to indium (Se:In) may be less than or equal to about 10:1, less than or equal to about 9:1, less than or equal to about 8:1, less than or equal to about 7:1, less than or equal to about 6.5:1, less than or equal to about 6:1, less than or equal to about 5.5:1, less than or equal to about 5:1, less than or equal to about 4.8:1, or less than or equal to about 4.5:1. The mole ratio of selenium to indium (Se:In) may be greater than or equal to about 1:1, greater than or equal to about 1.5:1, greater than or equal to about 2:1, greater than or equal to about 2.5:1, greater than or equal to about 3:1, greater than or equal to about 3.5:1, greater than or equal to about 3.8:1, or greater than or equal to about 4:1.

In the luminescent nanostructures of an embodiment, a mole ratio of zinc to indium (Zn:In) may be less than or equal to about 24:1, less than or equal to about 23:1, less than or equal to about 22:1, less than or equal to about 21:1, less than or equal to about 20:1, less than or equal to about 19:1, less than or equal to about 18:1, less than or equal to about 17:1, less than or equal to about 16:1, less than or equal to about 15:1, or less than or equal to about 14:1. In the luminescent nanostructures of an embodiment, a mole ratio of zinc to indium (Zn:In) may be greater than or equal to about 3:1, greater than or equal to about 4:1, greater than or equal to about 5:1, greater than or equal to about 6:1, greater than or equal to about 7:1, greater than or equal to about 8:1, greater than or equal to about 9:1, greater than or equal to about 10:1, greater than or equal to about 11:1, greater than or equal to about 12:1, greater than or equal to about 13:1, greater than or equal to about 14:1, or greater than or equal to about 15:1.

In the luminescent nanostructures of an embodiment, a mole ratio of phosphorus to indium (P:In) may be greater than or equal to about 0.7:1, greater than or equal to about 0.75:1, greater than or equal to about 0.8:1, greater than or equal to about 0.85:1, greater than or equal to about 0.88:1, greater than or equal to about 0.89:1, greater than or equal to about 0.9:1, greater than or equal to about 0.93:1, or greater than or equal to about 0.95:1. The mole ratio of phosphorus to indium (P:In) may be less than or equal to about 1.5:1, less than or equal to about 1.4:1, less than or equal to about 1.3:1, less than or equal to about 1.2:1, less than or equal to about 1.05:1, less than or equal to about 1.03:1, less than or equal to about 1:1, or less than or equal to about 0.98:1.

In the luminescent nanostructures of an embodiment, a mole ratio of indium to the chalcogen elements (e.g., a total sum of S and Se) (In:(S+Se)) may be greater than or equal to about 0.05:1, greater than or equal to about 0.06:1, greater than or equal to about 0.062:1, or greater than or equal to about 0.065:1. In the luminescent nanostructures of an embodiment, the mole ratio of indium to the chalcogen elements (e.g., a total sum of S and Se) (In:(S+Se)) may be less than or equal to about 0.15:1, less than or equal to about 0.14:1, less than or equal to about 0.13:1, less than or equal to about 0.12:1, less than or equal to about 0.11:1, less than or equal to about 0.105:1, less than or equal to about 0.1:1, less than or equal to about 0.095:1, less than or equal to about 0.09:1, less than or equal to about 0.085:1, less than or equal to about 0.08:1, or less than or equal to about 0.075:1.

An amount of a component included in the luminescent nanostructures as described herein may be determined with an appropriate analysis tool (for example, a quantitative analysis tool, e.g., an inductively coupled plasma atomic emission spectroscopy (ICP-AES), an X-ray photoelectron spectroscopy (XPS), a Rutherford backscattering spectroscopy (RBS), a time of flight secondary ion mass spectroscopy (TOFSIMS), an electron microscopy energy-dispersive X-ray spectroscopy (TEM-EDS), or the like, readily and reproducibly.

Without wishing to be bound by any theory, according to the research of the present inventors, it is believed that when a cadmium-free nanostructure including indium and phosphorus as an emission center has an inorganic shell coating including a zinc chalcogenide (e.g., ZnSe, ZnSeS, ZnS or a combination thereof), the optical properties of the nanostructures may be affected by various structural or chemical factors such as a chemical purity or a level of crystallization of the first semiconductor nanocrystal (emission center) or the inorganic shell, an interfacial state therebetween, or a thickness of the shell, respectively.

In addition, the present inventors have identified that a binding state of an organic ligand to an outermost layer of the luminescent nanostructure (e.g., an outermost inorganic shell thereof) may also have an effect on the (e.g. physical and/or optical) properties of the luminescent nanostructures. Accordingly, as mentioned above, satisfying the desired properties such as light absorption, stability, and/or a luminous efficiency for the luminescent nanostructures remains a challenging task to be addressed in the current state of the art. Moreover, the present inventors have also identified that in case of a patterned composite including the luminescent nanostructures a step used in the patterning process may also have an adverse effect on the luminescent properties (e.g., the luminous efficiency, the stability, or the like) of the nanostructures.

The indium phosphide based luminescent nanostructures (e.g., quantum dots) may have a shell of an increased thickness for a desired level of luminous efficiency and/or chemical or thermal stability. According to the research of the present inventors, it is believed that not only a shell thickness but also a shell composition may affect light absorption of the luminescent nanostructures.

The present inventors have also found that in the application for a color conversion panel, a reduced size of luminescent nanostructure may contribute to improvement of incident light absorption (e.g., absorption at a wavelength of about 455 nm), however at the reduced shell thickness, an expansion pressure of the electrons may increase, and this may have an adverse effect on a desired luminous property such as a full width at half maximum or a tail area. Therefore, in an embodiment, the luminescent nanostructures having reduced sizes may have an increased amount of sulfur to realize a desired luminous property. Without wishing to be bound by any theory, the increase of the sulfide in the second semiconductor nanocrystal (or the shell) may provide a stronger confinement effect.

However, the present inventors have also identified that, in case of the luminescent nanostructures having reduced sizes and emitting green light, an inorganic shell having an increased amount of sulfur may not achieve a desired combination of the properties (e.g., a luminous efficiency, an incident light absorption, and/or stability). The present inventors have identified that when green light emitting luminescent nanostructures having reduced sizes are positioned into a patterned composite, the luminous efficiency may be substantially limited and/or a desired level of the fwhm and/or a desired level of the tail emission, may not be achievable. The color conversion panel including such a composite may not realize an improved image quality in a display device. In addition, during the operation of the device, the color conversion panel can be placed under an increase temperature (e.g., of from about 40° C. to about 90° C. or from about 50° C. to about 60° C.), and under this condition, the composite including the luminous nanostructures may tend to exhibit a considerable decrease of luminous efficiency.

In an embodiment, the luminescent nanostructures having the increased amount of sulfur may include aluminum and chlorine in an amount recited herein, and as they are included in the color conversion panel in a form of a composite, they may achieve a desired level of properties (for example, a luminous efficiency, a color purity, and stability).

Without wishing to be bound by any theory, it is believed that the co-presence of the recited amounts of the chorine and the aluminum may contribute to further passivating a surface of the second semiconductor nanocrystal (e.g., ZnS and ZnSeS). Without wishing to be bound by any theory, it is believed that such a passivation may increase a bonding strength of a native organic ligand (e.g., a C5 or higher or a C10 or higher of an aliphatic carboxylic acid) that has been already present on the luminescent nanostructure. In an embodiment, the passivation by the chlorine for the luminescent nanostructure may further increase the binding strength of the organic ligand, and a surface stability (e.g., chemical stability) of the luminescent nanostructures may be further improved. Without wishing to be bound by any theory, it is believed that in the second semiconductor nanocrystal including the zinc and the sulfur, a formation energy of the mixed ligand system including the chlorine and the organic ligand may be different (e.g., lower) than a formation energy of the organic ligand.

Therefore, in an embodiment, the luminescent nanostructures include an increased amount of the sulfur (i.e., a mole ratio of the sulfur to selenium is greater than or equal to about 2:1), and further include the aluminum and the chlorine in such amounts that in the luminescent nanostructures, a mole ratio of the aluminum to sulfur is less than about 0.15 and a mole ratio of the chlorine is less than about 0.1.

In the luminescent nanostructures of an embodiment, a mole ratio of aluminum to sulfur (Al:S) may be greater than or equal to about 0.005:1, greater than or equal to about 0.007:1, greater than or equal to about 0.009:1, greater than or equal to about 0.01:1, greater than or equal to about 0.011:1, greater than or equal to about 0.012:1, greater than or equal to about 0.013:1, greater than or equal to about 0.014:1, greater than or equal to about 0.015:1, greater than or equal to about 0.016:1, greater than or equal to about 0.017:1, greater than or equal to about 0.018:1, greater than or equal to about 0.019:1, or greater than or equal to about 0.02:1. In the luminescent nanostructures of an embodiment, a mole ratio of aluminum to sulfur (Al:S) may be less than or equal to about 0.14:1, less than or equal to about 0.13:1, less than or equal to about 0.12:1, less than or equal to about 0.115:1, less than or equal to about 0.11:1, less than or equal to about 0.1:1, less than or equal to about 0.09:1, less than or equal to about 0.08:1, less than or equal to about 0.07:1, less than or equal to about 0.06:1, less than or equal to about 0.05:1, less than or equal to about 0.045:1, or less than or equal to about 0.04:1.

In the luminescent nanostructures of an embodiment, a mole ratio of chlorine to sulfur (Cl:S) may be less than about 0.08, less than or equal to about 0.079:1, less than or equal to about 0.078:1, less than or equal to about 0.077:1, less than or equal to about 0.076:1, less than or equal to about 0.075:1, less than or equal to about 0.074:1, less than or equal to about 0.073:1, less than or equal to about 0.072:1, less than or equal to about 0.071:1, less than or equal to about 0.07:1, less than or equal to about 0.069:1, or less than or equal to about 0.0685:1. In the luminescent nanostructures of an embodiment, a mole ratio of chlorine to sulfur (Cl:S) may be 0.005:1, greater than or equal to about 0.007:1, greater than or equal to about 0.009:1, greater than or equal to about 0.01:1, greater than or equal to about 0.011:1, greater than or equal to about 0.012:1, greater than or equal to about 0.013:1, greater than or equal to about 0.014:1, greater than or equal to about 0.015:1, greater than or equal to about 0.016:1, greater than or equal to about 0.017:1, greater than or equal to about 0.018:1, greater than or equal to about 0.019:1, greater than or equal to about 0.02:1, greater than or equal to about 0.025:1, greater than or equal to about 0.03:1, or greater than or equal to about 0.035:1.

In the luminescent nanostructures of an embodiment, a mole ratio of aluminum to zinc (Al:Zn) may be greater than or equal to about 0.005:1, greater than or equal to about 0.007:1, greater than or equal to about 0.009:1, greater than or equal to about 0.01:1, greater than or equal to about 0.011:1, greater than or equal to about 0.012:1, greater than or equal to about 0.013:1, greater than or equal to about 0.014:1, greater than or equal to about 0.015:1, greater than or equal to about 0.016:1, greater than or equal to about 0.017:1, greater than or equal to about 0.018:1, greater than or equal to about 0.019:1, greater than or equal to about 0.02:1, greater than or equal to about 0.021:1, greater than or equal to about 0.022:1, greater than or equal to about 0.023:1, greater than or equal to about 0.024:1, greater than or equal to about 0.025:1, greater than or equal to about 0.026:1, greater than or equal to about 0.027:1, greater than or equal to about 0.028:1, greater than or equal to about 0.029:1, greater than or equal to about 0.03:1, greater than or equal to about 0.031:1, greater than or equal to about 0.032:1, greater than or equal to about 0.033:1, greater than or equal to about 0.034:1, or greater than or equal to about 0.035:1. In the luminescent nanostructures of an embodiment, a mole ratio of aluminum to zinc (Al:Zn) may be less than or equal to about 0.14:1, less than or equal to about 0.13:1, less than or equal to about 0.12:1, less than or equal to about 0.115:1, less than or equal to about 0.11:1, less than or equal to about 0.1:1, less than or equal to about 0.09:1, less than or equal to about 0.085:1, less than or equal to about 0.08:1, less than or equal to about 0.075:1, less than or equal to about 0.07:1, less than or equal to about 0.065:1, less than or equal to about 0.06:1, less than or equal to about 0.055:1, less than or equal to about 0.05:1, less than or equal to about 0.045:1, less than or equal to about 0.04:1, less than or equal to about 0.039:1, less than or equal to about 0.038:1, less than or equal to about 0.037:1, less than or equal to about 0.036:1, or less than or equal to about 0.035:1.

In the luminescent nanostructures of an embodiment, a mole ratio of chlorine to zinc (Cl:Zn) may be less than about 0.08:1, less than or equal to about 0.079:1, less than or equal to about 0.078:1, less than or equal to about 0.077:1, less than or equal to about 0.076:1, less than or equal to about 0.075:1, less than or equal to about 0.074:1, less than or equal to about 0.073:1, less than or equal to about 0.072:1, less than or equal to about 0.071:1, less than or equal to about 0.07:1, less than or equal to about 0.069:1, less than or equal to about 0.068:1, less than or equal to about 0.067:1, less than or equal to about 0.066:1, less than or equal to about 0.065:1, less than or equal to about 0.064:1, less than or equal to about 0.063:1, less than or equal to about 0.062:1, less than or equal to about 0.061:1, less than or equal to about 0.06:1, less than or equal to about 0.059:1, less than or equal to about 0.058:1, less than or equal to about 0.057:1, less than or equal to about 0.056:1, less than or equal to about 0.055:1, less than or equal to about 0.054:1, less than or equal to about 0.053:1, less than or equal to about 0.052:1, less than or equal to about 0.051:1, less than or equal to about 0.05:1, less than or equal to about 0.049:1, less than or equal to about 0.049:1, less than or equal to about 0.048:1, less than or equal to about 0.047:1, less than or equal to about 0.046:1, less than or equal to about 0.045:1, less than or equal to about 0.044:1, less than or equal to about 0.043:1, less than or equal to about 0.042:1, less than or equal to about 0.041:1, or less than or equal to about 0.04:1.

In the luminescent nanostructures of an embodiment, a mole ratio of chlorine to zinc (Cl:Zn) may be greater than or equal to about 0.005:1, greater than or equal to about 0.007:1, greater than or equal to about 0.009:1, greater than or equal to about 0.01:1, greater than or equal to about 0.011:1, greater than or equal to about 0.012:1, greater than or equal to about 0.013:1, greater than or equal to about 0.014:1, greater than or equal to about 0.015:1, greater than or equal to about 0.016:1, greater than or equal to about 0.017:1, greater than or equal to about 0.018:1, greater than or equal to about 0.019:1, greater than or equal to about 0.02:1, greater than or equal to about 0.021:1, greater than or equal to about 0.022:1, greater than or equal to about 0.023:1, greater than or equal to about 0.024:1, greater than or equal to about 0.025:1, greater than or equal to about 0.03:1, or greater than or equal to about 0.035:1.

In an embodiment, the number of chlorine atoms per one luminescent nanostructure may be greater than or equal to about 35, greater than or equal to about 38, greater than or equal to about 40, or greater than or equal to about 42 (per one luminescent nanostructure). The number of chlorine atoms per one luminescent nanostructure may be less than or equal to about 200, less than or equal to about 150, less than or equal to about 100, less than or equal to about 90, or less than or equal to about 85 (per one luminescent nanostructure). The number of the chlorine atoms per one luminescent nanostructure may be calculated from the mole amount of the chlorine per a given weight of the nanostructures and the number of the nanostructures included for a given weight of the nanostructures.

In an embodiment, a method of producing the luminescent nanostructures includes:
  obtaining the first semiconductor nanocrystals (or core particles each including first semiconductor nanocrystal;
  reacting an aluminum-chlorine containing compound and an alkyl phosphine compound to obtain an aluminum-chlorine precursor;
  reacting a zinc precursor with a selenium precursor and a sulfur precursor simultaneously or sequentially, for example, in an organic solvent, in the presence of first semiconductor nanocrystal (or the core particle) and a first organic ligand to form the second semiconductor nanocrystal, wherein during the formation of the second semiconductor nanocrystal, the amounts of the selenium precursor and the sulfur precursor are controlled in order for the mole ratio of selenium to sulfur in the luminescent nanostructures to be greater than or equal to about 2:1, and the aluminum-chlorine precursor is added to a reaction medium at least one time (e.g., may be added once or may be separately in two or more additions).

In the method of an embodiment, a mole amount of the aluminum-chlorine precursor per one mole of indium, may be greater than or equal to about 0.02 moles, greater than or equal to about 0.04 moles, greater than or equal to about 0.06 moles, greater than or equal to about 0.08 moles. The mole amount of the aluminum-chlorine precursor per one mole of indium, may be less than or equal to about 1 mole, less than or equal to about 0.5 moles, less than or equal to about 0.3 moles, less than or equal to about 0.15 moles, or less than or equal to about 0.12 moles.

The aluminum-chlorine precursor may be formed into a solution with a predetermined concentration. The concentration may be controlled taking into account the desired amounts of the precursors. In an embodiment, the concentration of the aluminum-chlorine precursor may be less than or equal to about 10 mole/L (M), less than or equal to about 5 M, less than or equal to about 3 M, less than or equal to about 1M, or less than or equal to about 0.5 M. In an embodiment, the concentration of the aluminum-chlorine precursor may be 0.01 M, greater than or equal to about 0.1M, greater than or equal to about 0.2 M, greater than or equal to about 0.3 M, greater than or equal to about 0.4 M, or greater than or equal to about 0.5 M.

In an embodiment, the aluminum-chlorine precursor may be added to the reaction medium that includes a C5 or greater thiol compound (for example, a 010 or higher (mono)thiol compound such as dodecane thiol).

In an embodiment, the second semiconductor nanocrystal may be formed without using zinc chloride.

In the method of an embodiment, the sulfur precursor may include at least two (different) compounds. The at least two compounds may include a thiol compound having at least five carbons, a reaction product of sulfur with an alkyl phosphine compound (e.g., a dispersion of elemental sulfur in the alkyl phosphine solvent), or a combination thereof.

The alkyl phosphine compound may include $R_3P$, $R_3PO$, or a combination thereof, wherein the R is same as or different and each independently hydrogen, a substituted or unsubstituted C1 to C40 aliphatic hydrocarbon, a substituted or unsubstituted C6 to C40 aromatic hydrocarbon, or a combination thereof.

In an embodiment, the preparing of the first semiconductor nanocrystal (or a core particle including the same) may include heating an indium compound in the presence of a second organic ligand and an organic solvent to prepare an indium precursor solution; and injecting a phosphorus precursor into the indium precursor solution and heating the obtained mixture. The method may further include obtaining a zinc precursor prior to preparing an indium precursor solution, and preparing the indium precursor solution in the presence of the zinc precursor. Depending on the types, the zinc precursor may be obtained by heating a zinc compound and an organic ligand at a high temperature (for example, a temperature of greater than or equal to about 100° C. and less than or equal to about 200° C.) in an organic solvent. During the core synthesis, a mole ratio of zinc to indium may be greater than or equal to about 1:1, greater than or equal to about 1.1:1, or greater than or equal to about 1.2:1, and less than or equal to about 3:1, less than or equal to about 2.5:1, or less than or equal to about 2:1. In an embodiment, the zinc precursor and the indium precursor may include a carboxylate moiety. A mole ratio of the carboxylic acid-containing organic ligand to 1 mole of the metal in the zinc precursor (or the indium precursor) may be greater than or equal to about 1 mole, greater than or equal to about 1.5 moles, or greater than or equal to about 2 moles, and less than or equal to about 5 moles, less than or equal to about 4 moles, or less than or equal to about 3 moles.

The reaction medium for the formation of the second semiconductor nanocrystal may include the (e.g., presence of) sulfur precursor and the selenium precursor at the same time. In an embodiment, the sulfur precursor and the selenium precursor may both be present in the reaction medium for the preparation of the second semiconductor nanocrystal. In an embodiment, the aluminum-chlorine precursor may be first added to the reaction medium when the selenium precursor and the sulfur precursor (e.g., the thiol compound) are together present in the reaction medium (hereinafter, the first addition). In an embodiment, the aluminum-chlorine precursor may be added (for example, further added after the first addition) together with a sulfur precursor (e.g., the reaction product of the sulfur and the alkyl phosphine compound) (hereinafter, the second addition).

In an embodiment, in the formation of the second semiconductor nanocrystal, a mixture including the zinc precursor, the first organic ligand, and an organic solvent may be heated at a predetermined temperature (for example, of greater than or equal to about 100° C., greater than or equal to about 120° C., greater than or equal to about 130° C., greater than or equal to about 140° C., greater than or equal to about 150° C., or greater than or equal to about 200° C. and less than or equal to about 300° C., less than or equal to about 280° C., less than or equal to about 250° C., less than or equal to about 230° C., or a combination thereof). To the heated mixture, the first semiconductor nanocrystal, the selenium precursor, and the sulfur precursor (for example, a thiol compound, a reaction product of an alkyl phosphine compound and sulfur, or a combination thereof) may be added. The selenium precursor and the sulfur precursor may be added to form a second semiconductor nanocrystal of desired composition (for example, each independently of the other at least once or at least twice). A manner of the addition is not particularly limited and the addition can be made simultaneously or sequentially.

The forming of the second semiconductor nanocrystal may include forming a first shell layer including zinc, sulfur, and selenium on the semiconductor nanocrystal core (hereinafter, a first shell forming process), followed by forming a second semiconductor nanocrystal shell layer including zinc and sulfur, and selenium as needed, on the first semiconductor nanocrystal shell (hereinafter, a second shell forming process). During the formation of the shell (or the first or second shells), an amount of each of the precursors (e.g., the zinc precursor, the selenium precursor, and/or the sulfur precursor) may be controlled considering a structure and a composition of a final luminescent nanostructure (for example, having a core shell structure).

A zinc compound or a zinc precursor is not particularly limited and may be appropriately selected. For example, the zinc precursor may be a Zn metal powder, an alkylated Zn compound, Zn alkoxide, Zn carboxylate, Zn nitrate, Zn perchlorate, Zn sulfate, Zn acetylacetonate, Zn halide, Zn cyanide, Zn hydroxide, Zn oxide, Zn peroxide, or a combination thereof. The zinc precursor may be dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, and the like. The zinc precursors may be used alone or in combination of two or more. In an embodiment, the formation of the semiconductor nanocrystal may be carried out with or without using a zinc chloride.

The (first and/or second) organic ligand may include RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, RHPOOH, $R_2POOH$ (wherein, R and R' are independently a C1 to C40 (or C3 to C24) aliphatic hydrocarbon group (e.g., alkyl group, alkenyl group alkynyl group), or C6 to C40 (or C6 to C24) aromatic hydrocarbon group (e.g., C6 to C20 aryl group)), or a combination thereof. The organic ligand may coordinate to the surface of the obtained nanocrystal and may improve upon the dispersion of nanocrystal in the solution and/or effect the light emitting and electrical characteristics of the luminescent nanocrystals. Examples of the organic ligand may include a thiol such as methane thiol, ethane thiol, propane thiol, butane thiol, pentane thiol, hexane thiol, octane thiol, dodecane thiol, hexadecane thiol, octadecane thiol, or benzyl thiol; an amine such as methane amine, ethane amine, propane amine, butyl amine, pentyl amine, hexyl amine, octyl amine, dodecyl amine, hexadecyl amine, octadecyl amine, dimethyl amine, diethyl amine, or dipropyl amine; carboxylic acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine such as a substituted or unsubstituted methyl phosphine (e.g., trimethyl phosphine, methyldiphenyl phosphine, etc.), a substituted or unsubstituted ethyl phosphine (e.g., triethyl phosphine, ethyldiphenyl phosphine, etc.), a substituted or unsubstituted propyl phosphine, a substituted or unsubstituted butyl phosphine, substituted or unsubstituted pentyl phosphine, a substituted or unsubstituted octylphosphine (e.g., trioctylphosphine (TOP)), and the like; a phosphine oxide such as a substituted or unsubstituted methyl phosphine oxide (e.g., trimethyl phosphine oxide, methyldiphenyl phosphine oxide, etc.), a substituted or unsubstituted ethyl phosphine oxide (e.g., triethyl phosphine oxide, ethyldiphenyl phosphine oxide, etc.), a substituted or unsubstituted propyl phosphine oxide, a substituted or unsubstituted butyl phosphine oxide, a substituted or unsubstituted octylphosphine oxide (e.g., trioctylphosphine oxide (TOPO), and the like; a diphenyl phosphine, a triphenyl phosphine compound, or an oxide compound thereof; a phosphonic acid, a C5 to C20 alkylphosphinic acid such as hexylphosphinic acid, octylphosphinic acid, dodecanephosphinic acid, tetradecanephosphinic acid, hexadecanephosphinic acid, or octadecanephosphinic acid, or a C5 to C20 alkyl phosphonic acid but is not limited thereto. The organic ligand may be used alone or as a mixture of two or more of the above compounds.

The organic solvent may be selected from a C6 to C22 primary amine such as hexadecylamine; a C6 to C22 secondary amine such as dioctylamine; a C6 to C40 tertiary amine such as trioctylamine; a nitrogen-containing heterocyclic compound such as pyridine; a C6 to C40 aliphatic hydrocarbon (e.g., alkane, alkene, alkyne, etc.) such as hexadecane, octadecane, octadecene, or squalane; a C6 to C30 aromatic hydrocarbon such as phenyldodecane, phenyltetradecane, or phenyl hexadecane; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether, or benzyl ether, and a combination thereof. Types and amounts of the solvent may be appropriately selected considering precursors and organic ligands.

The type of the indium compound is not particularly limited and may be appropriately selected. The indium precursor may include an indium powder, alkylated indium (e.g., a C1-C18 alkylated) compound, indium alkoxide (e.g., a C1-08 alkoxide), indium carboxylate (e.g., a C1-C18 carboxylate), indium nitrate, indium perchlorate, indium sulfate, indium acetylacetonate, indium halide, indium cyanide, indium hydroxide, indium oxide, indium peroxide, indium carbonate, or a combination thereof. The indium precursor may include an indium carboxylate such as indium oleate and indium myristate, indium acetate, indium hydroxide, indium chloride, indium bromide, indium iodide, or a combination thereof. The forming of the indium precursor may be performed under vacuum at a temperature of greater than or equal to about 100° C., greater than or equal to about 120° C. and less than or equal to about 200° C.

The type of the phosphorus precursor is not particularly limited and may be appropriately selected. The phosphorus precursor may include tris(trimethylsilyl) phosphine, tris(dimethylamino)phosphine, triethylphosphine, tributylphosphine, trioctylphosphine, triphenylphosphine, tricyclohexylphosphine, dimethylaminophosphine, diethylaminophosphine, or a combination thereof.

During the core formation process, the mixture obtained by injecting the phosphorus precursor may be heated to a temperature of greater than or equal to about 150° C., greater than or equal to about 200° C., greater than or equal to about 250° C., or greater than or equal to about 270° C. and less than or equal to about 300° C., less than or equal to about 290° C., less than or equal to about 280° C., less than or equal to about 270° C., or less than or equal to about 260° C. In an embodiment, during the core formation process, one or more of the precursors (e.g., an indium precursor, a phosphorus precursor, and/or a zinc precursor) may be additionally injected at least once or twice (e.g., at least one or more times).

The core formation reaction time is not particularly limited, and may be appropriately selected in consideration of reactivity between precursors and core formation temperature.

The type of the selenium precursor is not particularly limited and may be appropriately selected. For example, the selenium precursor may be selenium-trioctylphosphine (Se-TOP), selenium-tributylphosphine (Se-TBP), selenium-triphenylphosphine (Se-TPP), selenium-diphenylphosphine (Se-DPP), or a combination thereof. The selenium precursor may be injected once or more (e.g., two or more times).

The sulfur precursor may be selected appropriately. In a method of an embodiment, the sulfur precursor may include at least two sulfur compounds, one of which includes a C1-30 thiol compound. In an embodiment, the sulfur precursor may be added to the reaction medium during when the selenium precursor is already present in the reaction vessel. In an embodiment, for the shell formation, a thiol compound and a sulfur precursor including or being prepared from elemental sulfur may be used. In an embodiment, for the first shell layer formation, the sulfur precursor may include a thiol compound (e.g., having a C4 to 20 aliphatic hydrocarbon) such as an alkane thiol (e.g., dodecane thiol). In an embodiment, for the second shell layer, the sulfur precursor may include sulfur dispersed in an alkylphosphine compound (e.g., a reaction product of sulfur and an (mono-, di-, tri-) alkyl (e.g., a C1 to C40 alkyl) phosphine compound). The second sulfur precursor may include an organic solvent dispersion of a sulfur powder (for example, sulfur-octadecene (S-ODE), sulfur-trioctylphosphine (S-TOP), sulfur-tributylphosphine (S-TBP), sulfur-triphenylphosphine (S-TPP), sulfur-trioctylamine (S-TOA), or trimethylsilyl sulfur), mercapto propyl silane, trimethylsilyl sulfide, ammonium sulfide, sodium sulfide, or a combination thereof.

A second semiconductor nanocrystal (or a shell) formation temperature may be appropriately selected. In an embodiment, the second semiconductor nanocrystal (or a shell) formation temperature may be greater than or equal to about 270° C., greater than or equal to about 280° C., greater than or equal to about 290° C., greater than or equal to about 300° C., greater than or equal to about 310° C., or greater than or equal to about 315° C. In an embodiment, the second semiconductor nanocrystal (or a shell) formation temperature may be less than or equal to about 350° C., less than or equal to about 340° C., less than or equal to about 330° C., or less than or equal to about 325° C.

A time for the second semiconductor nanocrystal or the shell formation is not particularly limited and may be appropriately selected. For example, the second semiconductor nanocrystal or the shell formation reaction may be performed, for example, for greater than or equal to about 20 minutes, greater than or equal to about 25 minutes, greater than or equal to about 30 minutes, greater than or equal to about 35 minutes, greater than or equal to about 40 minutes, greater than or equal to about 45 minutes, greater than or equal to about 50 minutes, greater than or equal to about 55 minutes, or greater than or equal to about 1 hour, but is not limited thereto. The second semiconductor nanocrystal or the shell formation reaction time may be less than or equal to about 3 hours.

During the second semiconductor nanocrystal or the shell formation, each precursor/compound may be added in a single step or a plurality of steps. When adding each precursor or the like in stepwise, the reaction may be performed for a predetermined time (e.g., greater than or equal to about 5 minutes, greater than or equal to about 10 minutes, or greater than or equal to about 15 minutes) in each step. The reaction may be performed under an inert gas atmosphere, air, or under vacuum, but is not limited thereto.

In the second semiconductor nanocrystal (e.g., in the formation of a first shell layer or a second shell layer formation), the selenium precursor may be added once or more (e.g., two or more times or three or more times, etc.). During the formation of the second shell layer or at the later stage of the second semiconductor nanocrystal, the selenium precursor may be present or absent in the reaction medium.

In an embodiment, the shell formation may include forming a first shell layer and a second shell layer, each reaction time may be appropriately selected depending on the desired shell composition, the type of precursor, and the reaction temperature. The formation of the second semiconductor nanocrystal or the shell (for example, a single shell or a multi-layered shell having a first shell layer and a second shell layer) may be (e.g., independently) performed for greater than or equal to about 40 minutes, greater than or equal to about 50 minutes, greater than or equal to about 60 minutes, greater than or equal to about 70 minutes, greater than or equal to about 80 minutes, or greater than or equal to about 90 minutes. The reaction time for the formation of the second semiconductor nanocrystal or the shell may be (e.g., independently) less than or equal to about 4 hours, less than or equal to about 3 hours, less than or equal to about 2 hours, less than or equal to about 1 hour, or less than or equal to about 30 minutes.

In an embodiment, the shell may be a multi-layered shell. In a reaction medium (e.g., for a formation of the first shell layer), a mole amount of selenium from the selenium precursor to a mole amount of indium may be controlled so that the first shell layer having a desired thickness may be formed during a predetermined reaction time. In an embodiment, in a reaction medium (e.g., for a formation of the first shell layer), a mole amount of selenium per one mole of indium may be greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles and less than or equal to about 20 moles, less than or equal to about 18 moles, less than or equal to about 15 moles, selenium per one mole of indium.

In the shell formation (e.g., an initial stage of the shell formation or during the formation of the first shell layer), an amount of a thiol compound (or a mole amount of sulfur from a thiol precursor) per one mole of indium, may be greater than or equal to about, 0.5 moles, greater than or equal to about 1 moles, greater than or equal to about 1.5 moles, or greater than or equal to about 2 moles and less than or equal to about 15 moles, less than or equal to about 10 moles, less than or equal to about 9 moles, less than or equal to about 6 moles, less than or equal to about 4 moles, or less than or equal to about 3 moles.

The reaction medium for the formation of the second shell layer may include or may not include a selenium precursor (e.g., described herein). The sulfur precursor for the formation of the first shell layer and the second shell layer may be the same or different. In an embodiment, the sulfur precursor of the first shell layer may include a thiol compound. In an embodiment, the sulfur precursor of the second shell layer may include a reaction product (or a dispersion) of the sulfur with an alkyl phosphine compound.

In an embodiment, in a reaction medium for the shell formation (e.g., during the formation of the second shell layer), an amount of sulfur as a sulfur precursor (e.g., a dispersion of the elemental sulfur in an organic solvent), per one mole of indium may be controlled to obtain a desired shell composition, taking into consideration the reactivity of the precursor and reaction temperature.

In an embodiment, in the shell formation (e.g., the first shell layer, the second shell layer, or a combination thereof), an amount of the sulfur precursor (or a mole of sulfur therefrom) per one mole of indium may be greater than or equal to about 0.1 moles, greater than or equal to about 0.5 moles, greater than or equal to about 1 moles, greater than or equal to about 2 moles, greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles, and less than or equal to about 45 moles, less than or equal to about 40 moles, less than or equal to about 35 moles, less than or equal to about 30 moles, less than or equal to about 25 moles, less than or equal to about 20 moles, less than or equal to about 19 moles, less than or equal to about 18 moles, less than or equal to about 16 moles, less than or equal to about 15 moles, less than or equal to about 14 moles, less than or equal to about 13 moles, less than or equal to about 12 moles, less than or equal to about 11 moles, less than or equal to about 10 moles, less than or equal to about 9 moles, less than or equal to about 8 moles, less than or equal to about 7 moles, less than or equal to about 6 moles, or less than or equal to about 5 moles.

A nonsolvent may be added into the obtained final reaction solution to precipitation of the quantum dots, the organic ligand-coordinated nanocrystals may then be separated (e.g., by filtration or centrifugation). The nonsolvent may be a polar solvent that is miscible with the solvent used in the reaction and the nanocrystals may be precipitated out (e.g., not-dispersible) therein. The nonsolvent may be selected depending on the solvent used in the reaction and may be for example, acetone, ethanol, butanol, isopropanol, ethanediol, water, tetrahydrofuran (THF), dimethylsulfoxide (DMSO), diethylether, formaldehyde, acetaldehyde, a solvent having a similar solubility parameter to the foregoing solvents, or a combination thereof. The separation may be performed through a centrifugation, precipitation, chromatography, or distillation. The separated nanocrystals may be added to a washing solvent and washed, if necessary. The washing solvent has no particular limit and may have a similar solubility parameter to that of the organic ligand and may, for example, include hexane, heptane, octane, chloroform, toluene, benzene, and the like.

The luminescent nanostructures may be dispersed in a dispersion solvent. The luminescent nanostructures may form an organic solvent dispersion. The organic solvent dispersion may not include water and/or an organic solvent miscible with water. The dispersion solvent may be appropriately selected. The dispersion solvent may include the aforementioned organic solvent. The dispersion solvent may include a substituted or unsubstituted C1 to C40 aliphatic hydrocarbon, a substituted or unsubstituted C6 to C40 aromatic hydrocarbon, or a combination thereof.

In an embodiment, the luminescent nanostructures may have a quantum efficiency (e.g., an absolute quantum yield) of greater than or equal to about 80%, greater than or equal to about 81%, greater than or equal to about 82%, greater than or equal to about 83%, greater than or equal to about 84%, greater than or equal to about 85%, or greater than or equal to about 90%. In an embodiment, the luminescent nanostructures may have a full width at half maximum of less than or equal to about 55 nm, less than or equal to about 50 nm, less than or equal to about 45 nm, less than or equal to about 44 nm, less than or equal to about 43 nm, less than or equal to about 42 nm, less than or equal to about 41 nm, or less than or equal to about 40 nm.

In an embodiment, the luminescent nanostructures may exhibit a full width at half maximum of greater than or equal to about 40 nm, greater than or equal to about 41 nm, greater than or equal to about 42 nm, greater than or equal to about 43 nm, greater than or equal to about 44 nm, greater than or equal to about 45 nm, greater than or equal to about 46 nm, greater than or equal to about 47 nm, greater than or equal to about 48 nm, greater than or equal to about 49 nm, or greater than or equal to about 51 nm, as they are dispersed in an organic solvent. In an embodiment, the luminescent nanostructures may exhibit a full width at half maximum of less than or equal to about 55 nm, less than or equal to about 54 nm, less than or equal to about 53 nm, less than or equal to about 52 nm, less than or equal to about 51 nm, or less than or equal to about 50 nm, as they are dispersed in an organic solvent.

In a time resolved photoluminescent spectroscopy analysis of the luminescent nanostructures, a percentage ratio of a maximum peak intensity of a trap emission defined with 60 ns to a maximum peak intensity of a band-edge emission defined with 30 ns may be less than or equal to about 45%, less than or equal to about 44%, less than or equal to about 43%, less than or equal to about 42%, less than or equal to about 41%, less than or equal to about 40%, less than or equal to about 39%, less than or equal to about 38%, less than or equal to about 37%, less than or equal to about 36%, or less than or equal to about 35%.

A size (or an average size) of the luminescent nanostructure(s) may be greater than or equal to about 1 nm, greater than or equal to about 2 nm, greater than or equal to about 3 nm, greater than or equal to about 4 nm, or greater than or equal to about 5 nm. The (average) size may be less than or equal to about 30 nm, less than or equal to about 25 nm, less than or equal to about 24 nm, less than or equal to about 23 nm, less than or equal to about 22 nm, less than or equal to about 21 nm, less than or equal to about 20 nm, less than or equal to about 19 nm, less than or equal to about 18 nm, less than or equal to about 17 nm, less than or equal to about 15 nm, less than or equal to about 14 nm, less than or equal to about 13 nm, less than or equal to about 12 nm, less than or equal to about 11 nm, less than or equal to about 10 nm, less than or equal to about 9 nm, less than or equal to about 8 nm, less than or equal to about 7 nm, less than or equal to about 6.5 nm, less than or equal to about 6 nm, less than or equal to about 5.8 nm, less than or equal to about 5.5 nm, or less than or equal to about 5 nm. In an embodiment, the luminescent nanostructures may have an average particle size (e.g., as determined by an electron microscope analysis) or a size confirmed by a composition thereof, of less than or equal to about 6.5 nm, less than or equal to about 6 nm, less than or equal to about 5.8 nm, less than or equal to about 5.5 nm, or less than or equal to about 5 nm.

The size may be a diameter. The size of the luminescent nanostructure(s) (if not spherical) may have an equivalent diameter calculated by converting a two-dimensional area identified by transmission electron microscopy into a circle. As used herein, a dimension such as a size (e.g., a quantum dot-related dimension) may refer to an average (mean or median average) value thereof (e.g., an average size).

A shape of the luminescent nanostructure is not particularly limited, and may for example be a spherical, polyhedron, pyramid, multi-pod, or cube shape, nanotube, nanowire, nanofiber, nanosheet, or a combination thereof, but is not limited thereto.

The luminescent nanostructure(s) may include and organic ligand and/or the organic solvent on a surface of the luminescent nanostructure(s). The organic ligand and/or the organic solvent may be bound to the surfaces of the luminescent nanostructure(s). The luminescent nanostructures may include a C10 or higher, (e.g, C10 to C40) aliphatic carboxylic acid bound to surfaces thereof. In the luminescent nanostructures of an embodiment, the passivation involving the chlorine may increase a binding strength of the organic ligand. Accordingly, in an evolved gas analysis for the luminescent nanostructures, a mole ratio of an aliphatic carboxylic acid detected at a temperature of greater than or equal to about 350° C. may be greater than or equal to about 0.85:1, greater than or equal to about 0.88:1, or greater than or equal to about 0.90:1.

The UV-Vis absorption spectrum (curve) of the luminescent nanostructures has a positive differential coefficient value (i.e., tangential slope) at 450 nm. In the UV-Vis absorption spectrum (curve), the differential coefficient value at 450 nm may be greater than 0, for example, greater than or equal to about 0.001, greater than or equal to about 0.002, greater than or equal to about 0.003, greater than or equal to about 0.004, greater than or equal to about 0.005, or greater than or equal to about 0.006. The differential coefficient value may be less than or equal to about 0.03, less than or equal to about 0.025, less than or equal to about 0.02, less than or equal to about 0.015, less than or equal to about 0.01, less than or equal to about 0.0095, less than or equal to about 0.009, or less than or equal to about 0.0085.

The luminescent nanostructure(s) of an embodiment may exhibit increased efficiency together with increased absorption rate for excitation light of greater than or equal to about 450 nm and less than or equal to about 470 nm. The differential coefficient value (i.e., a derivative of df(x)/dx, tangential slope) at 450 nm of the UV-Vis absorption curve may be easily measured by a simple analysis of the curve.

In the UV-Vis absorption spectrum of the luminescent nanostructures, the first absorption peak wavelength may be present at a wavelength of greater than about 450 nm and less than the photoluminescence emission peak wavelength. The first absorption peak wavelength may be present in a wavelength range of, for example, greater than or equal to about 455 nm, greater than or equal to about 460 nm, greater than or equal to about 465 nm, greater than or equal to about 470 nm, greater than or equal to about 475 nm, or greater than or equal to about 480 nm. The first absorption peak wavelength may be present in a wavelength range of less than or equal to about 505 nm, less than or equal to about 500 nm, less than or equal to about 495 nm, or less than or equal to about 490 nm.

In an UV-Vis absorption spectrum of the luminescent nanostructures, a valley depth (VD) defined by the following equation may be greater than or equal to about 0.2, greater than or equal to about 0.25, greater than or equal to about 0.3, greater than or equal to about 0.35, or greater than or equal to about 0.4:

$$1-(Abs_{valley}/Abs_{first})=VD$$

wherein, $Abs_{first}$ is an absorption rate at the first absorption peak, and $Abs_{valley}$ is an absorption rate at the lowest point of the valley adjacent to the first absorption peak.

In the UV-Vis absorption spectrum of the luminescent nanostructures, a lowest point of the valley may be present in a range of less than or equal to about 450 nm and greater than or equal to about 400 nm, or greater than or equal to about 420 nm.

The luminescent nanostructure(s) of an embodiment and a composite including the luminescent nanostructure(s) may emit green light with an increased blue light absorption (or improved incident light absorption) as well as enhanced luminous efficiency. For example, in a form of a composite, the luminescent nanostructures may exhibit improved thermal stability even as present in a device following processing under a high temperature operation. The luminescent nanostructure(s) of the embodiment may also exhibit a high level of chemical stability, and thus, even when the luminescent nanostructure(s) undergo a process of preparing a composition (e.g., a photoresist composition or a photosensitive composition) that involves contacting with a variety of chemical substances such as organic polymer, an organic solvent, a monomer, various additives) or a process of preparing a composite or a patterned composite using the composition, a resulting product such as a composition or a composite (or a pattern) may maintain an improvement of luminous properties.

In a color conversion panel of an embodiment, a first composite including the luminescent nanostructures may be for example prepared from a process involving a thermal treatment at a high temperature of about 180° C. for a time period of greater than or equal to about 30 minutes or less than or equal to about 1 hour in a form of a film (e.g., a patterned film). In an embodiment, the film of the luminescent nanostructure composite may have a thickness of greater than or equal to about 6 μm, for example, greater than or equal to about 7 μm, greater than or equal to about 8 μm, greater than or equal to about 9 μm, greater than or equal to about 10 μm, and less than or equal to about 40 micrometer (μm), less than or equal to about 35 micrometer (μm), less than or equal to about 30 micrometer (μm), less than or equal to about 25 μm, less than or equal to about 20 μm, or less than or equal to about 15 μm.

In a first composite, an amount of the luminescent nanostructures may be 10 weight percent (wt %), greater than or equal to about 15 wt %, greater than or equal to about 20 wt %, greater than or equal to about 25 wt %, or greater than or equal to about 30 wt % and less than or equal to about 50 wt %, less than or equal to about 45 wt %, or less than or equal to about 40 wt %, based on a total weight of the composite.

In the color conversion panel, the first composite may exhibit improved and high absorption for incident light having a wavelength of for example greater than or equal to about 450 nm, greater than or equal to about 455 nm, greater than or equal to about 457 nm and less than or equal to about 470 nm, less than or equal to about 465 nm, or less than or equal to about 460 nm. The composite or a color filter (e.g., a color conversion panel including the composite) may be used in a display device and may exhibit an improved color reproducibility for example with or even without a blue cut filter.

In an embodiment, for example in a color conversion panel, the first composite may show an incident light absorption of greater than or equal to about 84%, greater than or equal to about 86%, greater than or equal to about 87%, or greater than or equal to about 88%, wherein the incident light absorption is defined as below:

$$(B-B')/B\times100=\text{incident light absorption (\%)}$$

B: light dose of an incident light
B': light dose having passed through the first composite In an embodiment, for example in a color conversion panel, the first composite may show a light conversion efficiency (CE, %) of greater than or equal to about 35%, greater than or equal to about 36%, greater than or equal to about 37%, greater than or equal to about 38%, greater than or equal to about 39%, greater than or equal to about 40%, or greater than or equal to about 41%:

$$[A/(B-B')]\times100=\text{light conversion efficiency (CE,\%)}$$

A: light dose of green light emitted from the composite
B: light dose of an incident light
B': light dose having passed through the first composite.

The first composite or a film including the first composite may exhibit a loss percentage between a luminous efficiency (QY) at room temperature (e.g., 20° C. to 30° C.) and a luminous efficiency (QY) at about 80° C. (hereinafter, QY loss) that is less than or equal to about 15%, less than or equal to about 14%, less than or equal to about 13%, less than or equal to about 12.5%, less than or equal to about 12%, less than or equal to about 11%, less than or equal to about 10%, less than or equal to about 9.5%, less than or equal to about 9%, less than or equal to about 8.6%, less than or equal to about 8%, less than or equal to about 7.5%, or less than or equal to about 7.1%, at the irradiation of incident light of a wavelength of about 450 nm to about 460 nm:

$$QY \text{ loss (\%)}=[1-(QY \text{ at } 80°\text{ C.}/QY \text{ at room temperature})]\times100.$$

As the first composite is irradiated with an incident light of a wavelength of about 458 nm, a tail percentage defined by the following equation may be less than or equal to about 15%, less than or equal to about 14%, less than or equal to about 13%, less than or equal to about 12%, or less than or equal to about 11.5%:

A tail percentage (%)=[S2/S1]×100

S1: a total area of a maximum photoluminescent peak of the first composite (or the green light)
S2: an area of the maximum photoluminescent peak of the first composite (or the green light) in a wavelength region of greater than or equal to about 580 nm.

The first composite may exhibit a reduced level of a full width at half maximum (fwhm). In the color conversion panel of an embodiment, the first composite may emit green light of a desired wavelength having a fwhm of less than or equal to about 50 nm, less than or equal to about 45 nm, less than or equal to about 43 nm, less than or equal to about 40 nm, less than or equal to about 39.5 nm, or less than or equal to about 39 nm, less than or equal to about 38 nm, less than or equal to about 35 nm. The green light emitted from the first composite may have a maximum luminescent peak wavelength of greater than or equal to about 500 nm, or greater than or equal to about 505 nm. The maximum luminescent peak wavelength of the green light may be less than or equal to about 530 nm, less than or equal to about 525 nm, less than or equal to about 520 nm, less than or equal to about 515 nm, or less than or equal to about 510 nm.

In an embodiment, the color conversion panel may include a plurality of first regions and the color conversion layer may have a pattern so that each of the first regions may include the first composite therein. The composite or a patterned film including the same may be prepared by an ink composition via a photolithography or an inkjet printing manner. Accordingly, an embodiment provides a composition including a liquid vehicle and the aforementioned (e.g., a plurality of) luminescent nanostructure(s) (or a population thereof). The luminescent nanostructure(s) (or the population thereof) may be dispersed in the liquid vehicle.

The liquid vehicle may include a liquid monomer, an organic solvent, or a combination thereof. The ink composition may further include a metal oxide fine particle(s). The ink composition may further include a dispersing agent (for dispersing the luminescent nanostructures and/or the metal oxide fine particles). The dispersing agent may include a carboxylic acid group containing organic compound (e.g., a monomer or a polymer).

The liquid monomer may include a (photo)polymerizable monomer having a, e.g., at least one, carbon-carbon double bond. The composition may further include a (photo or a thermal) initiator. In the composition, a polymerization may be initiated by light or a heat.

Details of the luminescent nanostructures in the composition (or the composite) are as described herein. An amount of the luminescent nanostructure(s) in the composition (or a composite as described herein) may be appropriately controlled taking into consideration the use or application (e.g., a photoluminescent color filter or a color conversion layer of a color conversion panel) and components of the composition (or the composite). In an embodiment, the amount of the luminescent nanostructure may be greater than or equal to about 1 weight percent (wt %), for example, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %, based on a total weight or a total solids content of the composition. The amount of the luminescent nanostructure may be less than or equal to about 70 wt %, for example, less than or equal to about 65 wt %, less than or equal to about 60 wt %, less than or equal to about 55 wt %, or less than or equal to about 50 wt %, based on a total weight or a total solids content of the composition.

The weight percentage of the components relative to the total solids content in the composition may represent the contents of the components in the composite, which will be described herein.

In an embodiment, the ink composition may be a photoresist composition including a luminescent nanostructure that is applicable to a photolithography method. In an embodiment, the ink composition may be an inkjet composition that may provide a pattern by printing (e.g., a droplet discharge method such as inkjet printing). The ink composition according to an embodiment may not include a conjugated (or conductive) polymer (except a cardo binder that will be described later). In an embodiment, the composition according to an embodiment may include the conjugated or conductive polymer. In an embodiment, the conjugated polymer refers to a polymer having a conjugation double bond in its main chain (e.g., polyphenylenevinylene, etc.). In an embodiment, the composition may not include an organic solvent (i.e., may be a solvent free system). In an embodiment, an amount of a given component in the solvent free composition may correspond to the amounts of the given component in the first composite.

In the composition of an embodiment, the dispersing agent may contribute to ensuring dispersity of the luminescent nanostructures or metal oxide fine particles that will be described herein. In an embodiment, the dispersing agent may include a binder (or binder polymer). The dispersing agent or the binder may be an insulating polymer. The binder may include an organic compound (e.g., a monomer or a polymer) optionally including a carboxylic acid group (e.g., in the repeating unit).

The binder or the dispersing agent may be a carboxylic acid group containing compound.

The carboxylic acid group containing compound may include a copolymer of a monomer mixture including a first monomer including a carboxylic acid group and a carbon-carbon double bond, a second monomer including a carbon-carbon double bond and a hydrophobic moiety and not including a carboxylic acid group, and optionally a third monomer including a carbon-carbon double bond and a hydrophilic moiety and not including a carboxylic acid group;

a multiple aromatic ring-containing polymer having a backbone structure in which two aromatic rings are bound to a quaternary carbon atom that is a constituent atom of another cyclic moiety in the main chain and including a carboxylic acid group (—COOH) (hereinafter, a cardo binder); or a combination thereof.

In an embodiment, the dispersing agent may include the first monomer, the second monomer, and optionally the third monomer.

The carboxylic acid group-containing compound may have an acid value of greater than or equal to about 50 milligrams of KOH per gram compound (mg KOH/g). In an embodiment, the acid value of the carboxylic acid group-containing compound may be greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, greater than or equal to about 110 mg KOH/g, greater than or equal to about 120 mg KOH/g, greater than or equal to about 125 mg KOH/g, or greater than or equal to about 130 mg KOH/g. The acid value of the carboxylic acid group-containing compound may be, for example, less than or equal to about 250 mg KOH/g, for example, less than or equal to about 240 mg KOH/g, less than or equal to about 230 mg KOH/g, less than or equal to about 220 mg KOH/g, less than or equal to about 210 mg KOH/g, less than or equal to about 200 mg KOH/g, less than or equal to about 190 mg KOH/g, less than or equal to about 180 mg KOH/g, or less than or equal to about 160 mg KOH/g, but is not limited thereto.

The carboxylic acid group-containing compound may have a molecular weight (or weight average molecular weight) of greater than or equal to about 400 g/mol, greater than or equal to about 500 grams per mole (g/mol), greater than or equal to about 1000 g/mol, greater than or equal to about 2000 g/mol, greater than or equal to about 3000 g/mol, or greater than or equal to about 5000 g/mol. The carboxylic acid group-containing compound may have a weight average molecular weight of less than or equal to about 100,000 g/mol, for example, less than or equal to about 50,000 g/mol.

In the composition or the composite, an amount of the dispersing agent (e.g., the binder polymer) may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt %, based on a total weight or a total solid content of the composition, but is not limited thereto. The amount of the dispersing agent (e.g., the binder polymer) may be less than or equal to about 55 wt %, less than or equal to about 35 wt %, for example less than or equal to about 33 wt %, or less than or equal to about 30 wt %, based on a total weight or a total solid content of the composition (or the composite, hereinafter, "composition").

In the composition or the liquid vehicle, the polymerizable (e.g., photopolymerizable) monomer (hereinafter, may be referred to as "monomer") including the carbon-carbon double bond may include a (e.g., photopolymerizable) (meth)acryl-based, i.e., (meth)acryl-containing, monomer. The monomer may be a precursor for an insulating polymer.

An amount of the monomer may be greater than or equal to about 0.5 wt %, for example, greater than or equal to about 1 wt %, greater than or equal to about 2 wt %, greater than or equal to about 3 wt %, greater than or equal to about 5 wt %, or greater than or equal to about 10 wt %, based on a total weight or a total solid content of the composition. The amount of the monomer may be less than or equal to about 30 wt %, for example, less than or equal to about 28 wt %, less than or equal to about 25 wt %, less than or equal to about 23 wt %, less than or equal to about 20 wt %, less than or equal to about 18 wt %, less than or equal to about 17 wt %, less than or equal to about 16 wt %, or less than or equal to about 15 wt %, based on a total weight or a total solid content of the composition.

The (photo)initiator included in the composition is a compound that initiates (photo)polymerization of the aforementioned monomers in the composition. The initiator is a compound accelerating a radical reaction (e.g., radical polymerization of monomer) by producing radical chemical species under a mild condition (e.g., by heat or light). The initiator may be a thermal initiator or a photoinitiator. The initiator is not particularly limited and may be appropriately selected.

In the composition, an amount of the initiator may be appropriately adjusted taking into consideration types and amounts of the polymerizable monomers. In an embodiment, the amount of the initiator may be greater than or equal to about 0.01 wt %, for example, greater than or equal to about 1 wt % and less than or equal to about 10 wt %, for example, less than or equal to about 9 wt %, less than or equal to about 8 wt %, less than or equal to about 7 wt %, less than or equal to about 6 wt %, or less than or equal to about 5 wt %, based on a total weight (or a total solid content) of the composition, but is not limited thereto.

The composition (or the composite) may further include a (multiple or monofunctional) thiol compound having a, e.g., at least one, thiol group for example at the terminal end (or a moiety derived from a reaction between the thiol compound and the carbon-carbon double bond moiety, e.g., a sulfide group), a metal oxide fine particle, or a combination thereof.

The metal oxide fine particle may include $TiO_2$, $SiO_2$, $BaTiO_3$, $Ba_2TiO_4$, ZnO, or a combination thereof. In the composition, an amount of the metal oxide fine particle may be greater than or equal to about 1 wt %, greater than or equal to about 2 wt %, greater than or equal to about 3 wt %, greater than or equal to about 4 wt %, greater than or equal to about 5 wt %, or greater than or equal to about 10 wt % and less than or equal to about 50 wt %, less than or equal to about 40 wt %, less than or equal to about 30 wt %, less than or equal to about 25 wt %, less than or equal to about 20 wt %, less than or equal to about 15 wt %, less than or equal to about 10 wt %, less than or equal to about 5 wt %, less than or equal to about 3 wt %, based on a total weight (or a total solid content) of the composition. The metal oxide fine particle may be non-emissive (e.g., not emitting light). The metal oxide may include an oxide of a metal or a metalloid.

The metal oxide fine particle may have an appropriately selected diameter without a particular limit. The diameter of the metal oxide fine particle may be greater than or equal to about 100 nm, for example, greater than or equal to about 150 nm, or greater than or equal to about 200 nm and less than or equal to about 1,000 nm or less than or equal to about 800 nm.

The (poly)thiol compound may be a dithiol compound, a trithiol compound, a tetrathiol compound, or a combination thereof. In an embodiment, the thiol compound may be glycoldi-3-mercaptopropionate (e.g., ethylene glycol di-3-mercaptopropionate), glycoldimercaptoacetate (e.g., ethylene glycol dimercaptoacetate), trimethylolpropane-tris(3-mercaptopropionate), pentaerythritol tetrakis(3-mercaptopropionate), pentaerythritol tetrakis(2-mercaptoacetate), 1,6-hexanedithiol, 1,3-propanedithiol, 1,2-ethanedithiol, polyethylene glycol dithiol including 1 to 10 ethylene glycol repeating units, or a combination thereof.

An amount of the thiol compound may be less than or equal to about 50 wt %, less than or equal to about 40 wt %, less than or equal to about 30 wt %, less than or equal to about 20 wt %, less than or equal to about 10 wt %, less than or equal to about 9 wt %, less than or equal to about 8 wt %, less than or equal to about 7 wt %, less than or equal to about 6 wt %, or less than or equal to about 5 wt %, based on a total weight or a total solid content of the composition. The amount of the thiol compound may be greater than or equal to about 0.1 wt %, for example, greater than or equal to about 0.5 wt %, greater than or equal to about 1 wt %, greater than or equal to about 5 wt %, greater than or equal to about 10 wt %, greater than or equal to about 15 wt %, greater than or equal to about 20 wt %, greater than or equal to about 25 wt %, based on a total weight or a total solid content of the composition.

The composition or the liquid vehicle may further include an organic solvent. The composition or the liquid vehicle may not include an organic solvent. If present, a type of the usable organic solvent is not particularly limited. A type and an amount of the solvent may be appropriately selected by taking into consideration the aforementioned main components (i.e., the luminescent nanostructure, the dispersing agent, the photopolymerizable monomer, the photoinitiator, and if used, the thiol compound), and types and amounts of additives which will be described herein. The composition may include a solvent in a residual amount except for a desired amount of the solid content (non-volatile components).

In an embodiment, an example of the solvent may include, but are not limited to: ethyl 3-ethoxy propionate; an ethylene glycol series such as ethylene glycol, diethylene glycol, or polyethylene glycol; a glycol ether series such as ethylene glycol monomethyl ether, ethylene glycol monoethyl ether, diethylene glycol monomethyl ether, ethylene glycol diethyl ether, or diethylene glycol dimethyl ether; glycol ether acetates series such as ethylene glycol monomethyl ether acetate, ethylene glycol monoethyl ether acetate, diethylene glycol monoethyl ether acetate, or diethylene glycol monobutyl ether acetate; a propylene glycol series such as propylene glycol; a propylene glycol ether series such as propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, or dipropylene glycol diethyl ether; a propylene glycol ether acetate series such as propylene glycol monomethyl ether acetate or dipropylene glycol monoethyl ether acetate; an amide series such as N-methylpyrrolidone, dimethyl formamide, or dimethyl acetamide; a ketone series such as methyl ethyl ketone (MEK), methyl isobutyl ketone (MIBK), or cyclohexanone; a petroleum product such as toluene, xylene, or solvent naphtha; an ester series such as ethyl acetate, propyl acetate, butyl acetate, cyclohexyl acetate, or ethyl lactate; an ether such as diethyl ether, dipropyl ether, or dibutyl ether; chloroform, a C1 to C40 aliphatic hydrocarbon (e.g., alkane, alkene, or alkyne); a halogen (e.g., chloro) substituted C1 to C40 aliphatic hydrocarbon (e.g., dichloroethane, trichloromethane, or the like), a C6 to C40 aromatic hydrocarbon (e.g., toluene, xylene, or the like), a halogen (e.g., chloro) substituted C6 to C40 aromatic hydrocarbon, or a combination thereof.

If desired, the composition (or the composite) may further include various additives such as a light diffusing agent, a leveling agent, or a coupling agent in addition to the aforementioned components. The components (a binder, a monomer, a solvent, an additive, a thiol compound, a cardo binder, etc.) included in the composition (the composite) of an embodiment may be appropriately selected, for details described in, for example, US-2017-0052444-A1 may be referred.

In an embodiment, the composition may be prepared by a method including preparing a dispersion including the aforementioned luminescent nanostructures, a dispersing agent, and a solvent; and mixing the dispersion with the initiator, the polymerizable monomer (e.g., acryl-based monomer), optionally, the thiol compound, optionally, the metal oxide particulates, and optionally, the aforementioned additive. Each of the aforementioned components may be mixed sequentially or simultaneously, but mixing orders are not particularly limited.

The composition may provide a color conversion layer (or a pattern film of a composite) by a (e.g., radical) polymerization. The composition according to an embodiment may be a photoresist composition including luminescent nanostructures applicable to a photolithography method. In an embodiment, the color conversion layer or the patterned luminescent nanostructure composite film may be produced by a method using the photoresist composition. The method may include:

forming a film of the composition on a substrate (S1);
optionally prebaking the film (S2);
exposing a selected region of the film to light (e.g., a wavelength of less than or equal to about 400 nm) (S3); and
developing the exposed film with an alkali developing solution to obtain a pattern including the luminescent nanostructure-polymer composite (S4).

Figure 2A:
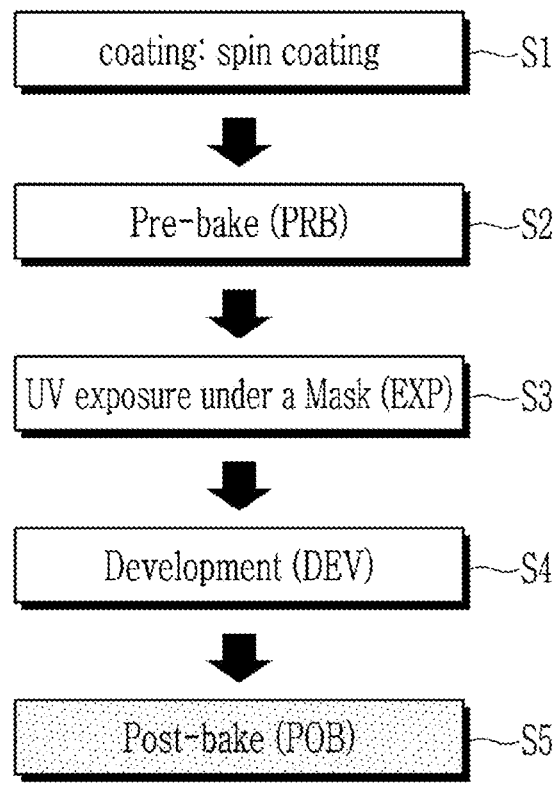
FIG. 2A shows a process of producing a luminescent nanostructure composite pattern using a composition according to an embodiment.
Figure 2A:
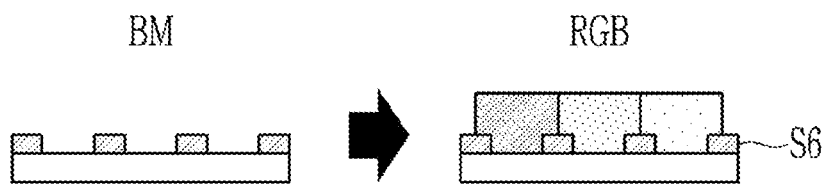

Non-limiting methods of forming the pattern are illustrated, referring to FIG. 2A.

The composition may be coated to have a predetermined thickness on a substrate in an appropriate method of spin coating, slit coating, and the like (S1). The formed film may be, optionally, pre-baked (PRB) (S2). The pre-baking may be performed by selecting appropriate conditions of temperature, time, atmosphere, and the like.

The formed (or optionally pre-baked) film is exposed to light having a predetermined wavelength under a mask (e.g., a photomask) having a predetermined pattern (S3). A wavelength and intensity of the light may be selected by taking into consideration the initiator (e.g., photoinitiator), an amount of the initiator (e.g., photoinitiator), the quantum dots, amounts of the quantum dots, and the like. In FIG. 2A, BM denotes a black matrix.

The exposed film is treated with an alkali developing solution (e.g., dipping or spraying) to dissolve an unexposed region and obtain a desired pattern. The obtained pattern may be, optionally, post-baked (FOB) to improve crack resistance and solvent resistance of the pattern, for example, at about 150° C. to about 230° C. for a predetermined time (e.g., greater than or equal to about 10 minutes or greater than or equal to about 20 minutes).

In an embodiment in which the color conversion layer or the luminescent nanostructure-polymer composite pattern has a plurality of repeating sections, a composite having a desired pattern may be obtained by preparing a plurality of compositions including a luminescent nanostructure having desired a photoluminescence property (e.g., a photoluminescence peak wavelength) to form each repeating section (e.g., a red light emitting luminescent nanostructure, a green light emitting luminescent nanostructure, or optionally, a blue light emitting luminescent nanostructure) and an appropriate number of times (e.g., two or more times or three or more times) repeating a formation of the pattern about each composition (S6). For example, the luminescent nanostructure-polymer composite may have, e.g., be provided in, a pattern including at least two repeating color sections (e.g., RGB sections). The luminescent nanostructure-polymer composite pattern may be used as a photoluminescence-type color filter or a color conversion layer in a display device or a color conversion panel.

Figure 2B:
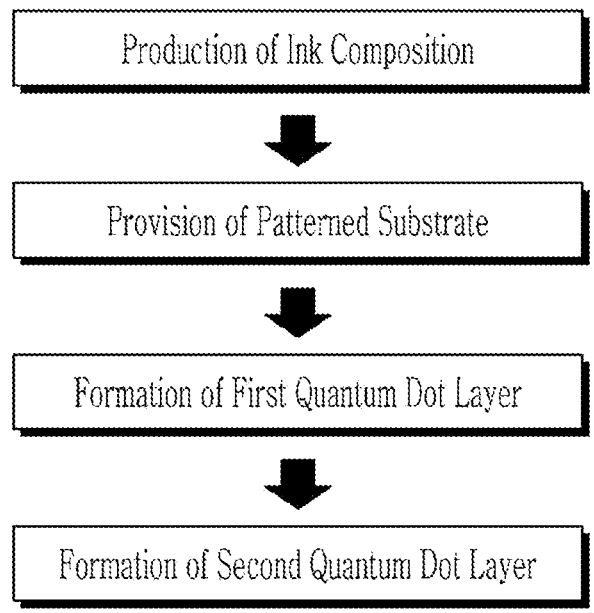
FIG. 2B shows a process of producing a luminescent nanostructure composite pattern using a composition according to an embodiment.

A color conversion layer or a luminescent nanostructure composite pattern may be formed by using an ink composition configured to form a pattern via an ink jet manner. Referring to FIG. 2B, the method includes preparing an ink composition; obtaining a substrate including a pattern of, for example, an electrode and optionally a pixel area formed by a bank; depositing an ink composition on the substrate (or the pixel area) to form a first quantum dot layer (or a first repeating section); and depositing an ink composition on the substrate (or the pixel area) to form a second quantum dot layer (or a second repeating section). Formation of the first quantum dot layer and the second quantum dot layer may be carried out simultaneously or sequentially.

Deposition of the ink composition may be carried out using an appropriate droplet discharging system such as an ink jet printer or a nozzle printing system (e.g., having an ink reservoir and a, e.g., at least one, printer head). The deposited ink composition may be heated to remove a solvent and optionally to carry out a polymerization, and thus, provide a (first or second) quantum dot layer. The method may provide a highly precise luminescent nanostructure-polymer composite film or pattern in a relatively simple way in a relatively short period of time.

In an embodiment, the first composite (e.g., a luminescent nanostructure polymer composite) includes a matrix (e.g., a polymer matrix); and the aforementioned luminescent nanostructures dispersed in the matrix. The first composite may further include the metal oxide fine particle dispersed in the matrix. The (polymer) matrix may include a linear polymer, a crosslinked polymer, or a combination thereof. The crosslinked polymer may include a thiolene resin, crosslinked poly(meth)acrylate, crosslinked polyurethane, a crosslinked epoxy resin, a crosslinked vinyl polymer, a crosslinked silicone resin, or a combination thereof. The linear polymer may include a repeating unit derived from carbon-carbon unsaturated bonds (e.g., carbon-carbon double bond). The repeating unit may include a carboxylic acid group. The linear polymer may include an ethylene repeating unit.

In the first composite of an embodiment, an amount of the plurality of luminescent nanostructures and an amount of the metal oxide fine particles are as set forth herein. In an embodiment, the amount of the matrix may be greater than or equal to about 10 wt %, greater than or equal to about 20 wt %, greater than or equal to about 30 wt %, greater than or equal to about 40 wt %, greater than or equal to about 50 wt %, or greater than or equal to about 60 wt %, based on a total weight of the composite. In an embodiment, the amount of the matrix may be less than or equal to about 90 wt %, less than or equal to about 80 wt %, less than or equal to about 70 wt %, less than or equal to about 60 wt %, less than or equal to about 50 wt %, or less than or equal to about 40 wt %, based on a total weight of the composite.

In the composite, a total amount of the quantum dots and the metal oxide fine particles may be greater than or equal to about 10 wt %, greater than or equal to about 20 wt %, greater than or equal to about 30 wt %, greater than or equal to about 40 wt %, greater than or equal to about 50 wt %, or greater than or equal to about 60 wt %, based on a total weight of the composite. In the composite, a total amount of the luminescent nanostructures and the metal oxide fine particles may be less than or equal to about 90 wt %, less than or equal to about 80 wt %, less than or equal to about 70 wt %, less than or equal to about 60 wt %, less than or equal to about 50 wt %, less than or equal to about 40 wt %, based on a total weight of the composite.

The luminescent nanostructures of the embodiment may exhibit a positive differential coefficient at a wavelength of about 450 nm and the first composite of an embodiment may also exhibit an improved absorption for the blue incident light and a relatively high luminous efficiency.

The (polymer) matrix may include a dispersing agent (e.g., a binder monomer or polymer including a carboxylic acid group), a polymerization product (e.g., insulating polymer) of a polymerizable monomer having a carbon-carbon double bond (a, e.g., at least one, for example, at least two, at least three, at least four, or at least five), optionally a polymerization product of the polymerizable monomer and a thiol compound (e.g., a polythiol compound having at least two thiol groups for example, at a terminal end thereof), or a combination thereof. In an embodiment, the polymer matrix may include a crosslinked polymer, a linear polymer, or a combination thereof. The polymer matrix may not include a conjugated polymer (excepting cardo resin). The polymer matrix may include a conjugated polymer.

The crosslinked polymer may include a thiolene resin, crosslinked poly(meth)acrylate, crosslinked polyurethane, a crosslinked epoxy resin, a crosslinked vinyl polymer, a crosslinked silicone resin, or a combination thereof. In an embodiment, the crosslinked polymer may be a polymerization product of the polymerizable monomer and, optionally, the multiple thiol compound.

The linear polymer may include a repeating unit derived from carbon-carbon unsaturated bonds (e.g., carbon-carbon double bond). The repeating unit may include a carboxylic acid group. The linear polymer may include an ethylene repeating unit.

The carboxylic acid group-containing repeating unit may include a unit derived from a monomer including a carboxylic acid group and a carbon-carbon double bond, a unit derived from a monomer having a dianhydride moiety, or a combination thereof.

The polymer matrix may include a carboxylic acid group-containing compound (e.g., a binder, a binder polymer, or a dispersing agent) (e.g., for dispersion of the quantum dots or the binder).

The first composite or a film or pattern thereof may have, for example, a thickness of, less than or equal to about 30 μm, for example less than or equal to about 25 μm, less than or equal to about 20 μm, less than or equal to about 15 μm, less than or equal to about 10 μm, less than or equal to about 8 μm, or less than or equal to about 7 μm and greater than or equal to about 2 μm, for example, greater than or equal to about 3 μm, greater than or equal to about 3.5 μm, greater than or equal to about 4 μm, greater than or equal to about 5 μm, greater than or equal to about 6 μm, greater than or equal to about 7 μm, greater than or equal to about 8 μm, greater than or equal to about 9 μm, or greater than or equal to about 10 μm.

The luminescent nanostructure(s), a composite (pattern) including the luminescent nanostructure(s), or a color conversion panel including the composite (or the pattern) be included in an electronic device. Such an electronic device may include a display device, a light emitting diode (LED), an organic light emitting diode (OLED), a quantum dot LED, a sensor, a solar cell, an imaging sensor, a photodetector, or a liquid crystal display device, but is not limited thereto. The aforementioned luminescent nanostructure(s) may be included in an electronic apparatus. Such an electronic apparatus may include a portable terminal device, a monitor, a notebook personal computer (PC), a television, an electronic display, a camera, an automobile, and the like, but are not limited thereto. The electronic apparatus may be a portable terminal device including a display device (or light emitting device) including quantum dots, a monitor, a notebook PC, or a television. The electronic apparatus may be a camera or a portable terminal device including an image sensor including luminescent nanostructure(s). The electronic apparatus may be a camera or a vehicle. The electronic apparatus may include a photodetector including the luminescent nanostructure(s).

In an embodiment, an electronic device or a display device (e.g., a display panel) may further include the color conversion panel and optionally a light source or a light emitting panel. In an embodiment, the display panel include a light emitting panel (or a light source), a color conversion panel, and a light transmitting layer disposed between the light emitting panel and the color conversion panel. The color conversion panel may further include a substrate, and the color conversion layer may be disposed on a surface of the substrate (see FIG. 3A and FIG. 4).

If present, the light source or the light emitting panel may be configured to provide incident light to the luminescent element. The incident light may have a luminescence peak wavelength in a range of greater than or equal to about 440 nm, for example, greater than or equal to about 450 nm, greater than or equal to about 500 nm, or greater than or equal to about 520 nm, and less than or equal to about 580 nm, for example, less than or equal to about 480 nm, less than or equal to about 470 nm, or less than or equal to about 460 nm.

In an embodiment, a device (e.g., a photoluminescent type device) may include a sheet of the luminescent nanostructure composite. Referring to FIG. 3B, a photoluminescence type device 400 includes a backlight unit and a liquid crystal panel, and the backlight unit may include a luminescent nanostructure polymer composite sheet (QD sheet). For example, the backlight unit may include a reflector, a light guide plate (LGP), a light source (blue LED, etc.), a luminescent nanostructure polymer composite sheet (QD sheet), and optical films (prism, dual brightness enhancement film (DBEF), etc.) and the like). The liquid crystal panel may be disposed on the backlight unit and may have a structure including a thin film transistor (TFT), liquid crystal (LC), and a color filter between two polarizers (Pol).

The luminescent nanostructure polymer composite sheet (QD sheet) may include luminescent nanostructures emitting red light and luminescent nanostructures emitting green light by absorbing light from a light source. Blue light from the light source may pass through the luminescent nanostructure polymer composite sheet, being combined with red light and green light emitted from luminescent nanostructures and converted to white light. The white light may be separated to blue light, green light, and red light by a color filter in the liquid crystal panel and may be emitted to the outside in each pixel.

The color conversion panel may further include a substrate and the color conversion layer may be disposed on the substrate.

In an embodiment, the color conversion layer or the color conversion panel may be disposed on a front surface (e.g., a light extraction surface) of a device (light emitting device or display device) in a form of a luminescent nanostructure (or a composite thereof) patterned film. The patterned film may include a repeating section configured to emit a desired light. The repeating section may include a first section. The first section may be a red light emitting section. The repeating section may include a second section. The second section may include a green light emitting section. The repeating section may include a third section. The third section may be a section that emits or transmits blue light. Details of the first, second, and third sections are as described herein.

The light emitting panel or the light source may be an element emitting incident light. The incident or excitation light may include blue light and, optionally, green light. The light source may include an LED. The light source may include an organic LED (OLED). On the front surface (light emitting surface) of the first section and the second section, an optical element to block (e.g., reflect or absorb) blue light (and optionally green light) for example, a blue light (and optionally green light) blocking layer or a first optical filter that will be described herein may be disposed. When the light source includes organic light emitting diode to emit blue light and an organic light emitting diode to emit green light, a green light removing filter may be further disposed on a third section through which blue light is transmitted.

The light emitting panel or the light source may include a plurality of light emitting units respectively corresponding to the first section and the second section, and the light emitting units may include a first electrode and a second electrode facing each other and an (organic) electroluminescent layer between the first electrode and the second electrode. The electroluminescent layer may include an organic light emitting material. For example, each light emitting unit of the light source may include an electroluminescent device (e.g., an organic light emitting diode (OLED)) structured to emit light of a predetermined wavelength (e.g., blue light, green light, or a combination thereof). Structures and materials of the electroluminescent device and the organic light emitting diode (OLED) are not particularly limited.

Hereinafter, a display panel and a color conversion panel will be described with reference to the drawings.

Figure 3A:
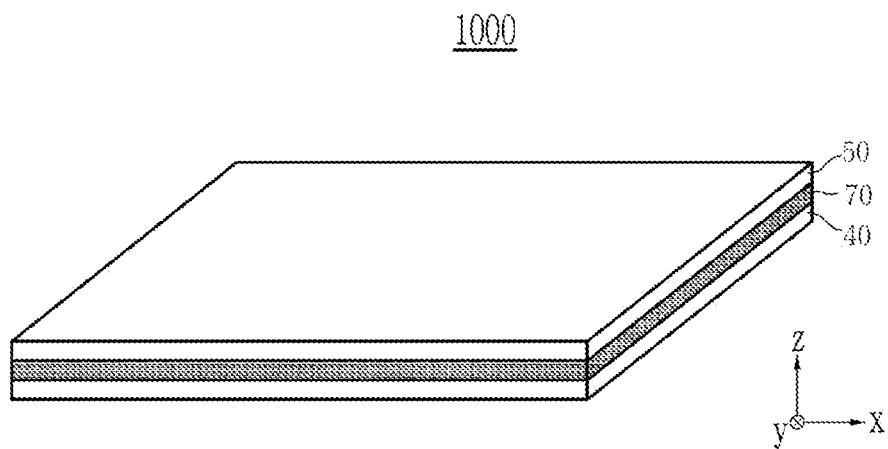
FIG. 3A is a perspective view showing an example of a display panel of an embodiment.
Figure 3B:
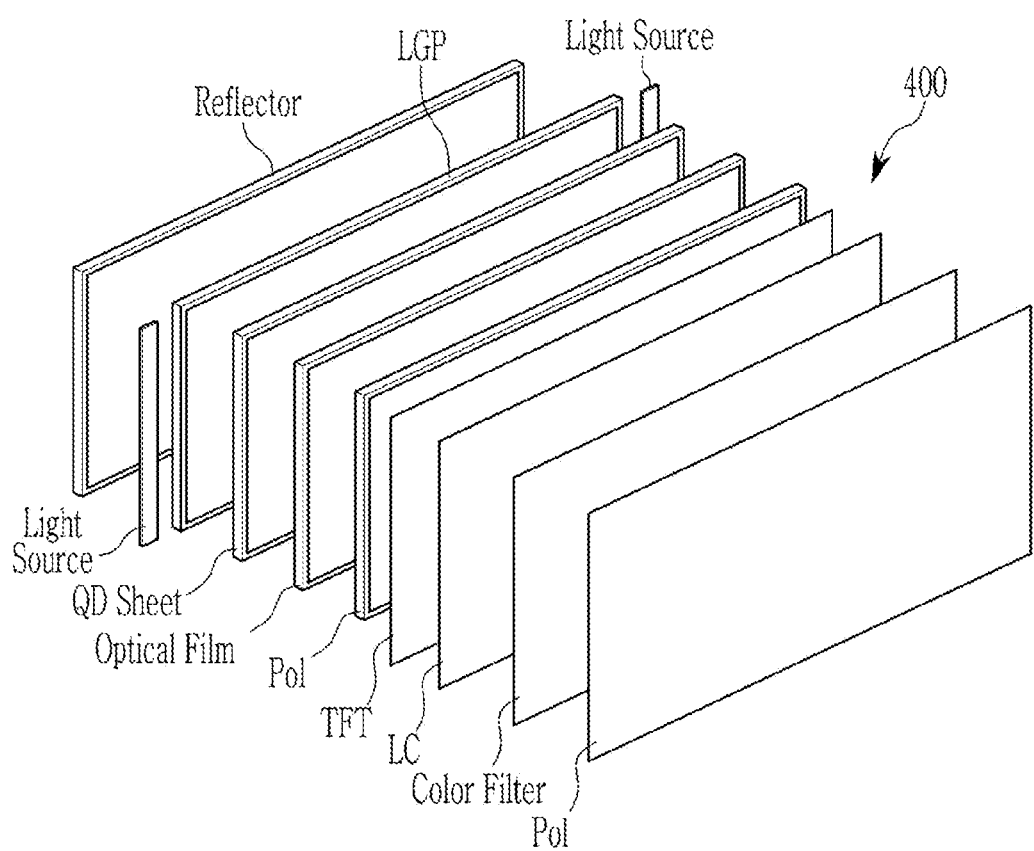
FIG. 3B is an exploded view of a display device of an embodiment.
Figure 4:
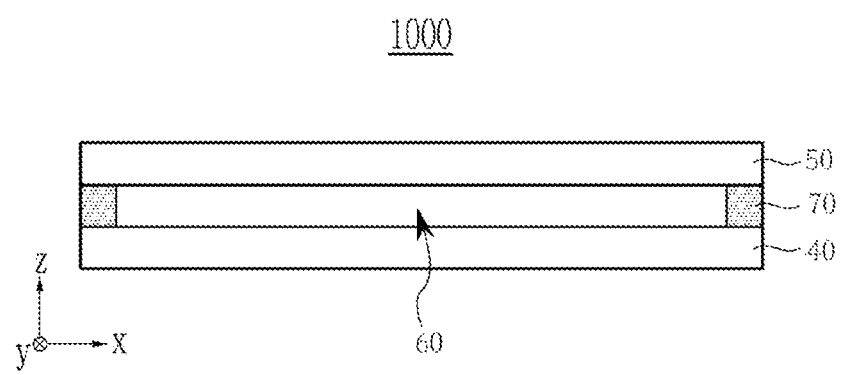
FIG. 4 is a cross-sectional view of the display panel of FIG. 3A.

FIG. 3A is a perspective view of an embodiment of a display panel constructed according to the principles of the invention. FIG. 4 is a cross-sectional view of the display panel of FIG. 3A. Referring to FIGS. 3A and 4, the display panel 1000 according to an embodiment includes a light emitting panel 40, a color conversion panel 50, a light transmitting layer 60 disposed between the light emitting panel 40 and the color conversion panel 50, and a binding material 70 binding the light emitting panel 40 and the color conversion panel 50.

The light emitting panel 40 and the color conversion panel 50 each with a surface opposite the other (i.e. the two panels face each other) with the light transmitting layer 60 disposed between the two panels, and the color conversion panel 50 is disposed in an orientation where light emitted from the light emitting panel 40 is directed toward the color conversion panel 50. The binding material 70 is disposed along edges of the light emitting panel 40 and the color conversion panel 50, and may be, for example, a sealing material.

Figure 5:
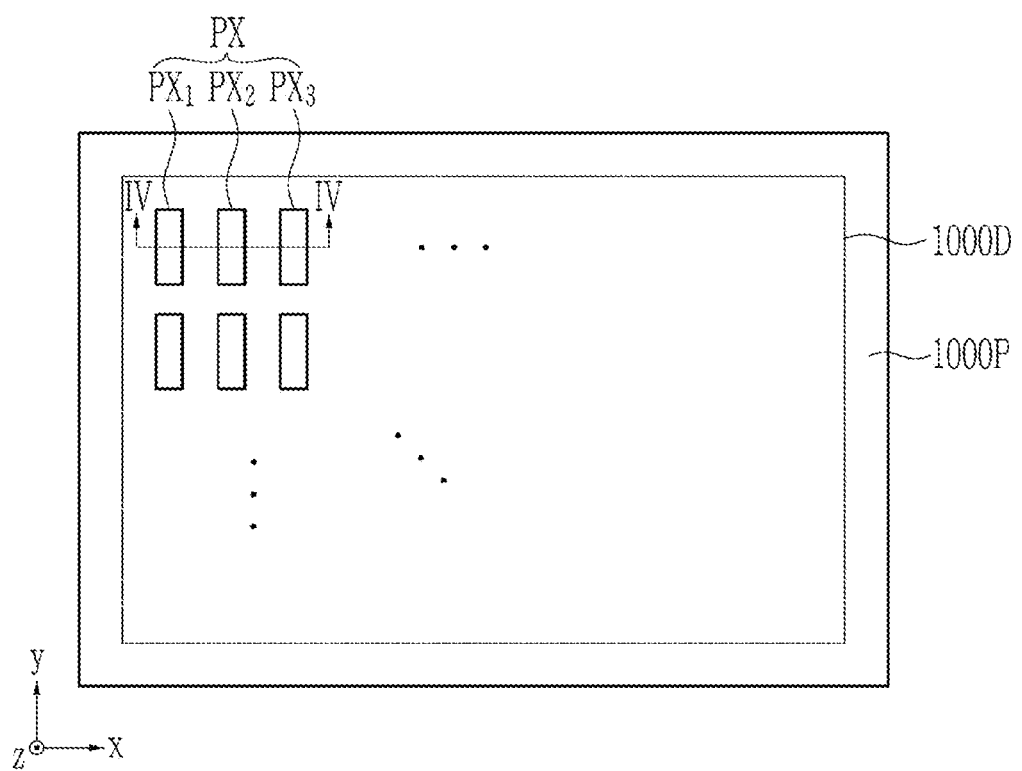
FIG. 5 is a plan view illustrating an example of a pixel arrangement of the display panel (e.g., as illustrated in FIG. 3A)

FIG. 5 is a plan view of an embodiment of a pixel arrangement of the display panel of an embodiment. Referring to FIG. 5, the display panel 1000 includes a display area 1000D displaying an image and a non-display area 1000P positioned in a peripheral area of the display area 1000D and disposed with a binding material 70.

The display area 1000D includes a plurality of pixels PX arranged along with a row (e.g., x direction), column (e.g., y direction), or a combination thereof, and each representative pixel PX includes a plurality of sub-pixels $PX_1$, $PX_2$, and $PX_3$ expressing, e.g., displaying, different colors from each other. An embodiment is exemplified with a structure in which three sub-pixels $PX_1$, $PX_2$, and $PX_3$ are configured to provide a pixel. An embodiment may further include an additional sub-pixel such as a white sub-pixel and may further include a, e.g., at least one, sub-pixel expressing, e.g., displaying the same color. The plurality of pixels PX may be aligned, for example, in a Bayer matrix, a matrix sold under the trade designation PenTile, a diamond matrix, or a combination thereof.

The sub-pixels $PX_1$, $PX_2$, and $PX_3$ may express, e.g., display, three primary colors or a color of a combination of three primary colors, for example, may express, e.g., display, a color of red, green, blue, or a combination thereof. For example, the first sub-pixel $PX_1$ may express, e.g., display, red, and the second sub-pixel $PX_2$ may express, e.g., display, green, and the third sub-pixel $PX_3$ may express, e.g., display, blue.

In the drawing, all sub-pixels are exemplified to have the same size, but at least one of the sub-pixels may be larger or smaller than other sub-pixels. In the drawing, all sub-pixels are exemplified to have the same shape, but at least one of the sub-pixels may have different shape from other sub-pixels.

Figure 6A:
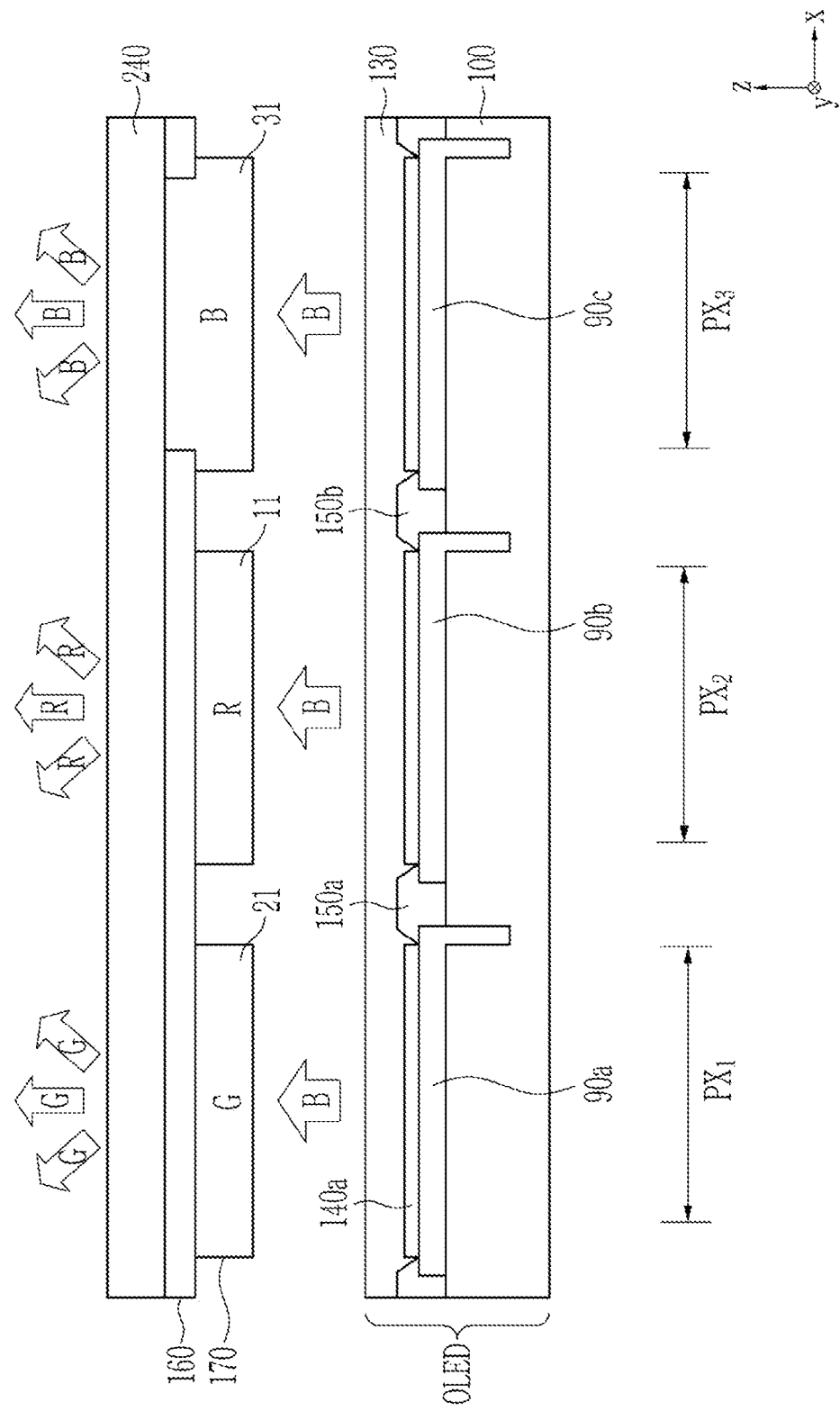
FIG. 6A is a cross-sectional view taken along line IV-IV (as shown in FIG. 5) of the display panel of an embodiment.
Figure 6B:
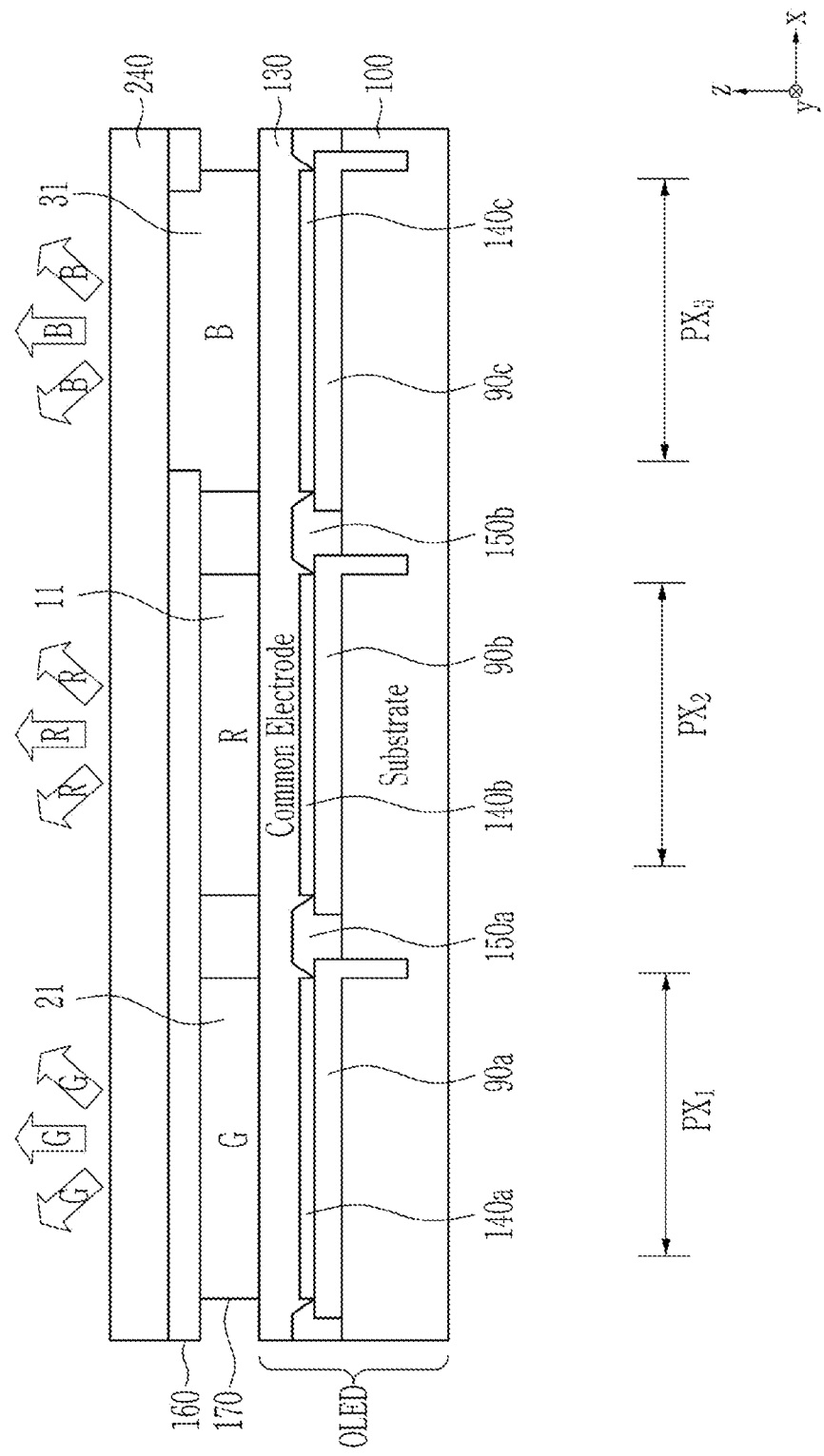
FIG. 6B is a cross-sectional view of a display panel according to an embodiment.

FIG. 6A is a schematic cross-sectional view of a display device according to an embodiment and FIG. 6B is a schematic cross-sectional view of a display device according to an embodiment. Referring to FIGS. 6A and 6B, the light source includes an organic light emitting diode (OLED) that emits blue (B) light (and optionally green light, for example, to provide incident light of mixed color). The organic light emitting diode (OLED) may include at least two pixel electrodes 90a, 90b, 90c formed on the substrate 100, a pixel define layer 150a, 150b formed between the adjacent pixel electrodes 90a, 90b, 90c, an organic light emitting layer 140a, 140b, 140c formed on each pixel electrode 90a, 90b, 90c, and a common electrode layer 130 formed on the organic light emitting layer 140a, 140b, 140c. A thin film transistor and a substrate may be disposed under the organic light emitting diode (OLED). Pixel areas of the OLED may be disposed corresponding to the first, second, and third sections.

A laminated structure including the luminescent nanostructure composite pattern 170 (e.g., a first section 11 or R including red light emitting luminescent nanostructures, a second section 21 or G including green light emitting luminescent nanostructures, and a third section 31 or B including or not including a luminescent nanostructure, e.g., a blue light emitting luminescent nanostructure) pattern and substrate 240 may be disposed on the light source. The blue light emitted from the light source enters the first section and second section and may emit red light and green light, respectively. The blue light emitted from the light source may pass through the third section. An element (first optical filter 160 or excitation light blocking layer) configured to block the excitation light may be disposed between the luminescent nanostructure composite layers R and G and the substrate, as desired. When the excitation light includes blue light and green light, a green light blocking filter (not shown) may be added to the third section. The first optical filter or the excitation light blocking layer will be described in more detail herein.

Such a (display) device may be produced by separately producing the aforementioned laminated structure and LED or OLED (e.g., emitting blue light) and then combining the laminated structure and LED or OLED. The (display) device may be produced by directly forming the luminescent nanostructure composite pattern on the LED or OLED.

In the color conversion panel or a display device, a substrate may be a substrate including an insulation material. The substrate may include glass; various polymers such as a polyester, (e.g., polyethylene terephthalate (PET), polyethylene naphthalate (PEN), and the like), polycarbonate, poly(meth)acrylate (e.g., a polyacrylate); a polysiloxane (e.g., polydimethylsiloxane (PDMS)); an inorganic material such as $Al_2O_3$ or ZnO; or a combination thereof, but is not limited thereto. A thickness of the substrate may be appropriately selected taking into consideration a substrate material but is not particularly limited. The substrate may have flexibility. The substrate may have a transmittance of greater than or equal to about 50%, greater than or equal to about 60%, greater than or equal to about 70%, greater than or equal to about 80%, or greater than or equal to about 90% for light emitted from the luminescent nanostructures.

A wire layer including a thin film transistor or the like is formed on the substrate. The wire layer may further include a gate line, a sustain voltage line, a gate insulating layer, a data line, a source electrode, a drain electrode, a semiconductor, a protective layer, and the like. The detailed structure of the wire layer may vary depending on an embodiment. The gate line and the sustain voltage line are electrically separated from each other, and the data line is insulated and crossing the gate line and the sustain voltage line. The gate electrode, the source electrode, and the drain electrode form a control terminal, an input terminal, and an output terminal of the thin film transistor, respectively. The drain electrode is electrically connected to the pixel electrode that will be described herein.

The pixel electrode may function as an electrode (e.g., anode) of the display device. The pixel electrode may be formed of a transparent conductive material such as indium tin oxide (ITO) or indium zinc oxide (IZO). The pixel electrode may be formed of a material having a light-blocking properties such as gold (Au), platinum (Pt), nickel (Ni), tungsten (W), chromium (Cr), molybdenum (Mo), iron (Fe), cobalt (Co), copper (Cu), palladium (Pd), or titanium (Ti). The pixel electrode may have a two-layered structure in which the transparent conductive material and the material having light-blocking properties are laminated sequentially.

Between two adjacent pixel electrodes, a pixel define layer (PDL) may overlap with a terminal end of the pixel electrode to divide the pixel electrode into a pixel unit. The pixel define layer is an insulation layer which may electrically block the at least two pixel electrodes.

The pixel define layer covers a portion of the upper surface of the pixel electrode, and the remaining region of the pixel electrode not covered by the pixel define layer may provide an opening. An organic light emitting layer that will be described herein may be formed in the region defined by the opening.

The organic light emitting layer defines each pixel area by the aforementioned pixel electrode and the pixel define layer. In other words, one pixel area may be defined as an area formed with one organic light emitting unit layer which is contacted with one pixel electrode divided by the pixel define layer. In the display device according to an embodiment, the organic light emitting layer may be defined as a first pixel area, a second pixel area and a third pixel area, and each pixel area is spaced apart from each other leaving a predetermined interval by the pixel define layer.

In an embodiment, the organic light emitting layer may emit a third light belonging to a visible light region or belonging to an ultraviolet (UV) region. The first to the third pixel areas of the organic light emitting layer may emit a third light. In an embodiment, the third light may be a light having the highest energy in the visible light region, for example, may be blue light (and optionally green light). When all pixel areas of the organic light emitting layer are designed to emit the same light, each pixel area of the organic light emitting layer may be all formed of the same or similar materials or may show, e.g., exhibit, the same or similar properties. Thus, a process of forming the organic light emitting layer may be simplified, and the display device may be easily applied to, e.g., made by, a large scale/large area process. However, the organic light emitting layer according to an embodiment is not necessarily limited thereto, but the organic light emitting layer may be designed to emit at least two different lights, e.g., at least two different colored lights.

The organic light emitting layer includes an organic light emitting unit layer in each pixel area, and each organic light emitting unit layer may further include an auxiliary layer (e.g., hole injection layer, hole transport layer, electron transport layer, etc.) besides the light emitting layer.

The common electrode may function as a cathode of the display device. The common electrode may be formed of a transparent conductive material such as indium tin oxide (ITO) or indium zinc oxide (IZO). The common electrode may be formed on the organic light emitting layer and may be integrated therewith.

A planarization layer or a passivation layer (not shown) may be formed on the common electrode. The planarization layer may include a (e.g., transparent) insulating material for ensuring electrical insulation with the common electrode.

In an embodiment, the display device may further include a lower substrate, a polarizing plate disposed under the lower substrate, and a liquid crystal layer disposed between the laminated structure and the lower substrate, and in the laminated structure, the photoluminescence layer (i.e., light emitting layer) may be disposed to face the liquid crystal layer. The display device may further include a polarizing plate between the liquid crystal layer and the light emitting layer. The light source may further include LED and if desired, a light guide plate.

Figure 7:
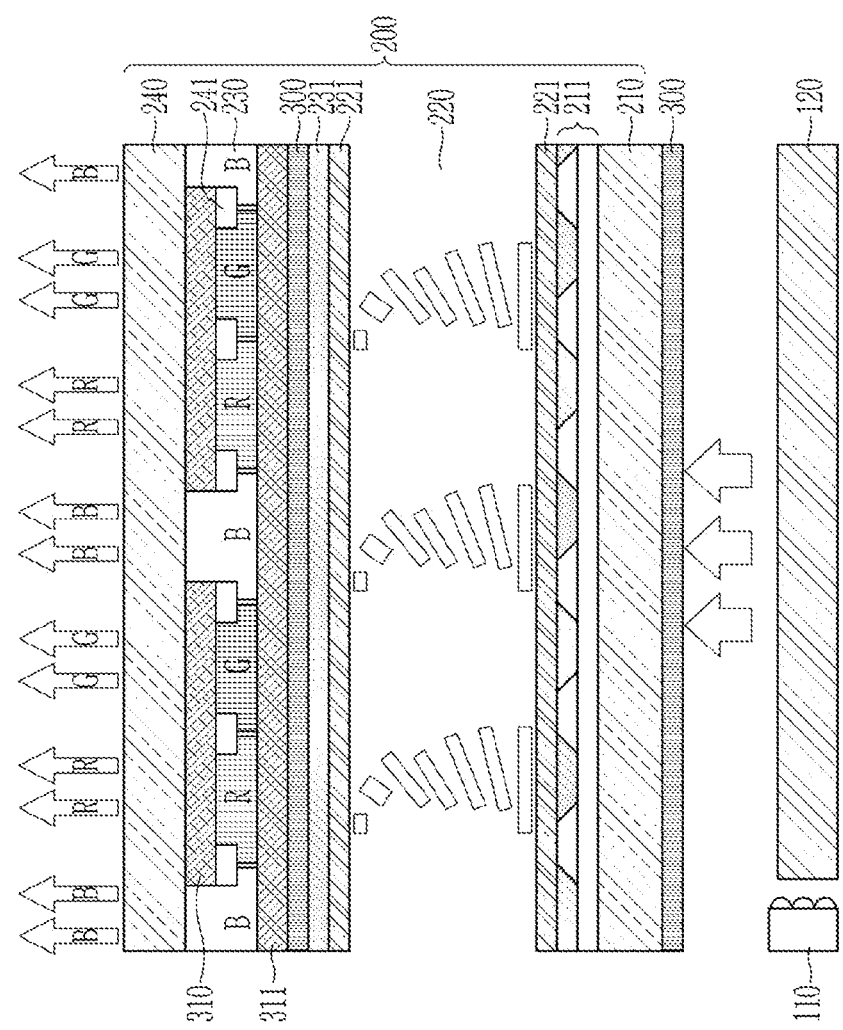
FIG. 7 is a cross-sectional view of a display device (e.g., a liquid crystal display device) according to an embodiment.

Non-limiting examples of the display device (e.g., a liquid crystal display device) according to an embodiment are illustrated with a reference to a drawing. FIG. 7 is a schematic cross-sectional view showing a liquid crystal display according to an embodiment. Referring to FIG. 7, the display device of an embodiment includes a liquid crystal panel 200, a polarizing plate 300 disposed under the liquid crystal panel 200, and a backlight unit disposed under the polarizing plate 300.

The liquid crystal panel 200 includes a lower substrate 210 of a stack structure, and a liquid crystal layer 220 disposed between the stack structure and the lower substrate. The stack structure includes a transparent substrate 240, a first optical filter layer 310, a photoluminescent layer 230 including a pattern of a luminescent nanostructure polymer composite, and a second optical filter layer 311.

The lower substrate 210 referred to as an array substrate may be a transparent insulation material substrate. The substrate is the same as described herein. A wire plate 211 is provided on an upper surface of the lower substrate 210. The wire plate 211 may include a plurality of gate wires (not shown) and data wires (not shown) that define a pixel area, a thin film transistor disposed adjacent to a crossing region of gate wires and data wires, and a pixel electrode for each pixel area, but is not limited thereto. Details of such a wire plate are not particularly limited.

The liquid crystal panel 200 may include an alignment layer 221 on and under the liquid crystal layer 220 to initially align the liquid crystal material included therein. Details (e.g., a liquid crystal material, an alignment layer material, a method of forming liquid crystal layer, a thickness of liquid crystal layer, or the like) of the liquid crystal layer and the alignment layer are not particularly limited.

A lower polarizing plate 300 is provided under the lower substrate 210. Materials and structures of the polarizing plate 300 are not particularly limited. A backlight unit (e.g., emitting blue light) may be disposed under the polarizing plate 300. An upper optical element or the polarizing plate 300 may be provided between the liquid crystal layer 220 and the transparent substrate 240, but is not limited thereto. For example, the upper polarizing plate may be disposed between the liquid crystal layer 220 and the photoluminescent layer 230. The polarizing plate may be any suitable polarizer that used in a liquid crystal display device. The polarizing plate may be TAC (triacetyl cellulose) having a thickness of less than or equal to about 200 μm, but is not limited thereto. In an embodiment, the upper optical element may be a coating that controls a refractive index without a polarization function.

The backlight unit includes a light source 110. The light source 110 may emit blue light or white light. The light source 110 may include a blue LED, a white LED, a white OLED, or a combination thereof, but is not limited thereto.

The backlight unit may further include a light guide plate 120. In an embodiment, the backlight unit may be an edge-type lighting. For example, the backlight unit may include a reflector (not shown), a light guide plate (not shown) provided on the reflector and providing a planar light source to the liquid crystal panel 200, a, e.g., at least one, optical sheet (not shown) on the light guide plate, for example, a diffusion plate, a prism sheet, and the like, or a combination thereof, but is not limited thereto. The backlight unit may not include a light guide plate. In an embodiment, the backlight unit may be a direct lighting. For example, the backlight unit may have a reflector (not shown), and may have a plurality of fluorescent lamps disposed on the reflector at regular intervals, or may have an LED operating substrate on which a plurality of light emitting diodes may be disposed, a diffusion plate thereon, and optionally a, e.g., at least one, optical sheet. Details (e.g., each component of a light emitting diode, a fluorescent lamp, a light guide plate, various optical sheets, and a reflector) of such a backlight unit are not particularly limited.

A black matrix 241 is provided under the transparent substrate 240 and has openings and hides a gate line, a data line, and a thin film transistor of the wire plate on the lower substrate. For example, the black matrix 241 may have a lattice shape. The photoluminescent layer 230 is provided in the openings of the black matrix 241 and has a luminescent nanostructure composite pattern including a first section (R) configured to emit a first light (e.g., red light), a second section (G) configured to emit a second light (e.g., green light), and a third section (B) configured to emit/transmit, for example blue light. If desired, the photoluminescent layer 230 may further include a, e.g., at least one, fourth section. The fourth section may include a luminescent nanostructure that emits a light of different color from light emitted from the first to third sections (e.g., cyan, magenta, and yellow light).

In the photoluminescent layer 230, sections forming the pattern may be repeated corresponding to pixel areas formed on the lower substrate 210. A transparent common electrode 231 may be provided on the photoluminescent type color filter layer.

The third section (B) configured to emit/transmit blue light may be a transparent color filter that does not change an emission spectrum of the light source. Blue light emitted from the backlight unit may enter in a polarized state and may be emitted through the polarizing plate and the liquid crystal layer as is. If desired, the third section may include a luminescent nanostructure emitting blue light.

As described herein, if desired, the display device or a light emitting device of an embodiment may further have an excitation light blocking layer or a first optical filter layer (hereinafter referred to as a first optical filter layer). The first optical filter layer may be disposed between the bottom surface of the first section (R) and the second section (G) and the substrate (e.g., the upper substrate 240) or on the upper surface of the substrate. The first optical filter layer 310 may be a sheet having an opening in a region corresponding to a pixel area (a third section) displaying blue and thus formed in a region corresponding first and second sections. The first optical filter layer may be disposed at the positions except the position overlapped with the third section and integrally therewith as shown in FIGS. 6A, 6B, and FIG. 7, but is not limited thereto. In an embodiment, at least two first optical filter layers may be disposed leaving a space at each position overlapped with the first and second sections. When the light source includes a green light emitting element, a green light blocking layer may be disposed on the third section. In an embodiment, the light source may further include a green light emitting element, and a green light cutting (or removing) element may be disposed on the third region.

The first optical filter layer may block (e.g., absorb) or substantially block light having, for example, a predetermined wavelength region in the visible light region and may transmit light in the other wavelength regions, and for example, the first optical filter layer may block blue light (or green light) and may transmit light except the blue light (or green light). The first optical filter layer may transmit, for example, green light, red light, and/or yellow light which is a mixed color thereof. The first optical filter layer may transmit the blue light and may block or cut the green light, and may be disposed on the third region (e.g., a blue light emitting region).

The first optical filter layer may substantially block excitation light and transmit light in a desired wavelength range. The transmittance of the first optical filter layer for the light in a desired wavelength range may be greater than or equal to about 70%, greater than or equal to about 80%, greater than or equal to about 90%, or even about 100%.

The first optical filter layer configured to selectively transmit red light may be disposed at a position overlapped with the red light emission section, and the first optical filter layer configured to selectively transmit green light may be disposed at a position overlapped with the green light emission section. The first optical filter layer may include a first region that blocks (e.g., absorb) blue light and red light and selectively transmits light of a predetermined range (e.g., greater than or equal to about 500 nm, greater than or equal to about 510 nm, or greater than or equal to about 515 nm and less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm); a second region that blocks (e.g., absorb) blue light and green light and selectively transmits light of a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm); or a combination thereof. In an embodiment, the light source may emit a mixed light of blue and green lights, the first optical filter layer may further include a third region that can selectively transmit blue light and can block green light.

The first region may be disposed at a position overlapped with the green light emitting section. The second region may be disposed at a position overlapped with the red light emitting section. The third region may be disposed at a position overlapped with the blue light emitting section.

The first region, the second region, and, optionally, the third region may be optically isolated. Such a first optical filter layer may contribute to improvement of color purity of the display device.

The display device may further include a second optical filter layer (e.g., a red/green or yellow light recycle layer) 311 disposed between the photoluminescent layer and the liquid crystal layer (e.g., the photoluminescent layer and the upper polarizing plate, e.g., polarizer), transmitting at least a portion of third light (excitation light), and reflecting a, e.g., at least one, part of the first light, part of the second light, or part of each of the first light and second light. The first light may be red light, the second light may be green light, and the third light may be blue light. For example, the second optical filter layer may transmit only the third light (B) in a blue light wavelength region having a wavelength region of less than or equal to about 500 nm and light in a wavelength region of greater than about 500 nm, which is green light (G), yellow light, red light (R), or the like, may be not passed through the second optical filter layer and reflected. The reflected green light and red light may pass through the first and second sections and to be emitted to the outside of the display device.

The second optical filter layer or the first optical filter layer may be formed as an integrated layer having a relatively planar surface.

The first optical filter layer may include a polymer thin film including a dye absorbing light in a wavelength which is to be blocked, a pigment absorbing light in a wavelength which is to be blocked, or a combination thereof. The second optical filter layer and the first optical filter layer may include a single layer having a low refractive index, and may be, for example, a transparent thin film having a refractive index of less than or equal to about 1.4, less than or equal to about 1.3, or less than or equal to about 1.2. The second optical filter layer or the first optical filter layer having a low refractive index may be, for example, a porous silicon oxide, a porous organic material, a porous organic/inorganic composite, or a combination thereof.

The first optical filter layer or the second optical filter layer may include a plurality of layers having different refractive indexes. The first optical filter layer or the second optical filter layer may be formed by laminating two layers having different refractive indexes. For example, the first/second optical filter layer may be formed by alternately laminating a material having a high refractive index and a material having a low refractive index.

Hereinafter, the embodiments are illustrated in more detail with reference to examples. However, they are exemplary embodiments of the present invention, and the present invention is not limited thereto.

EXAMPLES

Analysis Methods
1. Ultraviolet (UV)-Visible (Vis) Absorption Analysis

An Agilent Cary5000 spectrophotometer is used to conduct UV-Visible absorption spectroscopy analysis, whereby a UV-Vis absorption spectrum and a first differential coefficient of the spectrum at about 450 nm are measured as described.

2. Photoluminescence (PL) Analysis

A Hitachi F-7000 spectrophotometer is used to conduct a photoluminescent (PL) spectroscopy analysis and PL spectrums of the luminescent nanostructure and the composite are obtained.

The QY or the QE (of the solution or the composite) may be measured using software and manual instructions provided from the equipment manufacturer and using procedures well known to those of ordinary skill. From the photoluminescent spectrum of the composite, a full width at half maximum, a maximum luminescent peak wavelength, and a tail percentage are measured and calculated. The tail area is measured by integrating the photoluminescent spectrum in a wavelength range of greater than or equal to about 580 nm. The integration can be performed by a commercially available computer program (e.g., an integration tool) or a software often provided or available with the optical equipment, and again, is a process that is in accordance with knowledge well-known and understood in the art. The computer program (e.g., Exel® and/or Origin software) may draw a curve from a data file for example a file name extension of ".cvs" and may conduct a calculation of an area under a curve.

3. Inductively Coupled Plasma-Atomic Emission Spectroscopy (ICP-AES) Analysis and Ion Chromatography Analysis An inductively coupled plasma-atomic emission spectroscopy (ICP-AES) analysis is performed using Shimadzu ICPS-8100. An ion chromatography analysis is carried out by using Thermo fisher ICS-5000+.

4. Blue Light Absorption and Light Conversion of Composite

QE-2100, Otsuka equipped with an integrating hemisphere is used to measure a light dose (B) of blue incident light having a predetermined wavelength. Subsequently, a luminescent nanostructure polymer composite is placed in the integrating hemisphere and irradiated by the blue incident light to measure a green light dose (A) and a blue light dose (B') from the composite.

The measurements are used to obtain a blue light absorption and a light conversion according to the following equations.

Blue light absorption (%)=((B−B')/B)×100

Light conversion efficiency (CE,%)=(A/(B−B'))×100

5. QY Loss Measurement

QE-2100, Otsuka is used to measure an absolute quantum yield for the composite at 80° C. and room temperature (20° C.-30° C.) and the QY loss is measured by the following equation:

QY loss (%)=[1−(QY at 80° C./QY at room temperature)]×100.

6. Measurement of the Number of Chlorine Atoms Per a Luminescent Nanostructure.

The number of Cl atoms included in a given luminescent nanostructure population is measured using an ion chromatography analysis. The weight of the given luminescent nanostructure population is measured to calculate the number of the luminescent nanostructures included in the population. The number of the Cl atoms is divided with the number of the luminescent nanostructures to calculate the number of the chlorine atoms per a single luminescent nanostructure.

Reference Example 1

Zinc acetate and oleic acid are dissolved in 1-octadecene in a 250 mL reaction flask and heated at 120° C. under vacuum. The reaction flask is then allowed to cool to room temperature to obtain a zinc oleate solution.

To the reaction flask, indium acetate and lauric acid are added, and the mixture is heated at 120° C. under vacuum. A mole ratio of zinc and oleic acid is 1:2, a mole ratio of indium and lauric acid is 1:3. After 1 hour nitrogen is introduced into the reaction flask, and the temperature in the reaction flask is increased to 250° C. A mixed solution of tris(trimethylsilyl)phosphine ((TMSi)$_3$P) and trioctylphosphine is rapidly injected into the reaction flask, and the reaction is allowed to continue. After the reaction is complete, the reaction solution is rapidly cooled to room temperature. Acetone is added to facilitate formation of the first semiconductor nanocrystal, and the nanocrystals are separated with a centrifuge and dispersed in toluene.

The amounts of indium, zinc, and phosphorous used in the preparation have a mole ratio of 6:7:4.5. The absorption spectrum of the obtained InZnP core exhibits a first absorption wavelength of about 430 nm.

Example 1

1. Synthesis of the Luminescent Nanostructures and Characterization Thereof.

Selenium and sulfur are dispersed in trioctylphosphine (TOP) to obtain a Se/TOP stock solution and a S/TOP stock solution, respectively. Zinc chloride is dispersed in TOP and stirred at 100° C., and then added to a prepared aluminum chloride-TOP solution (hereinafter, AlCl$_3$-TOP).

In a 2 L reaction flask, zinc acetate and oleic acid are dissolved in trioctyl amine and the solution is subjected to vacuum at 120° C. for 10 minutes. Nitrogen is introduced into the flask and during when the temperature of the solution is heated to a reaction temperature of 280° C., a toluene dispersion of the prepared first semiconductor nanocrystal of InZnP, Se/TOP, and dodecane thiol are injected into the flask. After the temperature of the flask reaches the reaction temperature, the AlCl$_3$-TOP solution (0.04 mmol) is injected (a first addition) and the reaction temperature is maintained.

Thereafter, a second addition of AlCl$_3$-TOP solution (0.04 mmol) is injected together with the S/TOP, and the reaction is allowed to proceed to obtain a resulting solution including luminescent nanostructures including the first semiconductor nanocrystal and the second semiconductor nanocrystal. The second semiconductor nanocrystal may be disposed on the first semiconductor nanocrystal. The reaction mixture is allowed to cool to room temperature.

A total reaction time is about 75 minutes and the mole amounts of each of selenium from the Se precursor, sulfur from the S precursor, and zinc from the zinc precursor added per one mole of the indium is controlled so that the final luminescent nanostructure has the composition set forth in Table 1.

An excess amount of ethanol is added to the reaction mixture to facilitate precipitation and the luminescent nanostructures are separated with a centrifuge. After centrifugation, the supernatant is discarded and the precipitate nanostructures is dried and dispersed in chloroform or toluene to obtain a luminescent nanostructure solution (hereinafter, QD solution).

For the obtained luminescent nanostructures, an ICP-AES analysis and an IC analysis are carried out and the results are shown in Table 1 and Table 2. An UV-Vis absorption spectroscopy analysis and a photoluminescent spectroscopy analysis are conducted and the results are shown in Table 3.

2. Production of a Luminescent Nanostructure Composite and a Pattern Thereof.

A toluene dispersion including the plurality of the luminescent nanostructures prepared above (from step 1) is mixed with a solution of a binder polymer, which is a four membered copolymer of methacrylic acid, benzyl methacrylate, hydroxyethyl methacrylate, and styrene, (acid value: 130 milligrams (mg) of KOH per gram (mg KOH/g), molecular weight: 8,000 grams per mole (g/mol)) (solvent: propylene glycol monomethyl ether acetate, PGMEA, a concentration of 30 percent by weight, wt %) to form a luminescent nanostructure-binder dispersion.

To the prepared luminescent nanostructure-binder dispersion, a hexaacrylate having the following structure (as a photopolymerizable monomer), ethylene glycol di-3-mercaptopropionate (hereinafter, 2T, as a multi-thiol compound), an oxime ester compound (as an initiator), $TiO_2$ as a metal oxide fine particle (light diffusing agent), and PGMEA (as a solvent) are added to obtain a composition.

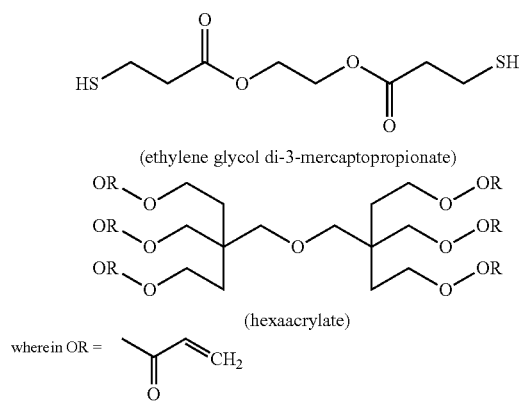

based on a total solid content, the prepared composition includes 42 weight percent (wt %) of luminescent nanostructures, 3 wt % of a light diffusing agent, and a total of 55 wt % of the binder polymer, 2T, the photopolymerizable monomer, and the photoinitiator. The total solid content is about 25%.

The obtained composition is spin-coated on a glass substrate at 150 revolutions per minute (rpm) for 5 seconds (s) to provide a film. The obtained film is pre-baked at 100° C. (PRB). The pre-baked film is exposed to light (wavelength: 365 nanometers (nm), intensity: 100 millijoules (mJ), under a mask having a predetermined pattern (e.g., a square dot or stripe pattern) for 1 second (s) (EXP) and developed with a potassium hydroxide aqueous solution (concentration: 0.043 weight %) for 50 seconds to obtain a pattern of a luminescent nanostructure polymer composite (thickness: 6 micrometers (μm)).

The obtained pattern is heat-treated at a temperature of 180° C. for 30 minutes under a nitrogen atmosphere (FOB).

For the luminescent nanostructure composite pattern thus obtained, optical properties are measured and the results are shown in Table 4. A blue light absorption of the pattern as measured is about 84.6%.

Examples 2 to 6

[1] The luminescent nanostructures are prepared in the same manner as in Example 1 except that an amount of the Se/TOP solution and an amount of the sulfur precursor per one mole of indium are changed to obtain the respective Example compositions as shown in Table 1. The amount of the $AlCl_3$-TOP solution is also changed as shown in Table 2.

For the obtained luminescent nanostructures, an ICP-AES analysis, an ion chromatography, an UV-Vis absorption spectroscopy analysis, and a photoluminescent spectroscopy analysis are conducted for each of Examples 2 to 6 and the results are shown in Tables 1 to 3.

[2] A luminescent nanostructure-polymer composite pattern is obtained in the same manner as in Example 1, except for using the luminescent nanostructures prepared in each of Examples 2 to 6, respectively. For each of the luminescent nanostructure composite pattern thus obtained, optical properties are measured and the results are shown in Table 4. The blue light absorption of each the patterns is measured, which is about 85% or higher.

Comparative Examples 1 to 3

The luminescent nanostructures are prepared in the same manner as in Example 1 except that the amount of the Se/TOP solution and the amount of the sulfur precursor per one mole of indium are changed to obtain the composition as shown in Table 1. The amount of the $AlCl_3$-TOP solution is also changed as shown in Table 2.

For the obtained luminescent nanostructures, an ICP-AES analysis, an ion chromatography, an UV-Vis absorption spectroscopy analysis, and a photoluminescent spectroscopy analysis are conducted and the results are shown in Tables 1 to 3.

A luminescent nanostructure-polymer composite pattern is obtained in the same manner as in Example 1, except for using the luminescent nanostructures prepared in each of Comparative Examples 1 to 3, respectively. For each of the luminescent nanostructure composite patterns thus obtained, optical properties are measured and the results are shown in Table 4.

Comparative Example 4-1

The luminescent nanostructures are prepared in the same manner as in Example 1 except that the Se/TOP and the sulfur precursor per one mole of indium are changed to obtain the composition as shown in Table 1 and instead of the $AlCl_3$-TOP solution, $ZnCl_2$ and $Al(OH)_2$ Stearate is added in the amounts as shown in Table 2.

For the obtained luminescent nanostructures, an ICP-AES analysis, an ion chromatography, an UV-Vis absorption spectroscopy analysis, and a photoluminescent spectroscopy analysis are conducted and the results are shown in Tables 1 to 3.

A luminescent nanostructure-polymer composite pattern is obtained in the same manner as in Example 1, except for using the luminescent nanostructures prepared in each of Examples 2 to 4, respectively. For each of the luminescent nanostructure composite patterns thus obtained, optical properties are measured and the results are shown in Table 4.

Comparative Example 4-1

The luminescent nanostructures are prepared in the same manner as in Example 1 except that the Se/TOP and the sulfur precursor per one mole of indium are changed to obtain the composition as shown in Table 1 and the $AlCl_3$-TOP solution is not used.

For the obtained luminescent nanostructures, an ICP-AES analysis, an ion chromatography, an UV-Vis absorption spectroscopy analysis, and a photoluminescent spectroscopy analysis are conducted and the results are shown in Tables 1 to 3.

A luminescent nanostructure-polymer composite pattern is obtained in the same manner as in Example 1, except for using the luminescent nanostructures prepared in each of Examples 2 to 4, respectively. For each of the luminescent nanostructure composite patterns thus obtained, optical properties are measured and the results are shown in Table 4.

TABLE 1

| | Mole ratio | | | |
|---|---|---|---|---|
| | Zn:In | Se:In | (Se + S):In | S:Se |
| Example 1 | 19.03:1 | 3.81:1 | 13.77:1 | 2.596:1 |
| Example 2 | 20.22:1 | 4.24:1 | 15.02:1 | 2.542:1 |
| Example 3 | 22.8:1 | 4.2:1 | 16.34:1 | 2.890:1 |
| Example 4 | 21.63:1 | 4.16:1 | 15.25:1 | 2.665:1 |
| Example 5 | 21.09:1 | 4.20:1 | 15.91:1 | 2.788:1 |
| Example 6 | 19.26:1 | 3.97:1 | 14.32:1 | 2.607:1 |
| Comp. Example 1 | 20.69:1 | 3.80:1 | 13.69:1 | 2.60:1 |
| Comp. Example 2 | 17.54:1 | 4.13:1 | 13.41:1 | 2.247:1 |
| Comp. Example 3 | 20.65:1 | 3.56:1 | 13.31:1 | 2.739:1 |
| Comp. Example 4-1 | 30.0:1 | 15.4:1 | 24.1:1 | 0.565:1 |
| Comp. Example 4-2 | 40:1 | 6.80:1 | 21.9:1 | 2.22:1 |

TABLE 2

| | $AlCl_3$ first addition | $AlCl_3$ second addition | Al:S | Cl:S | Al:Zn | Cl:Zn |
|---|---|---|---|---|---|---|
| Example 1 | 0.04 | 0.04 | 0.0482:1 | 0.0683:1 | 0.0252:1 | 0.0357:1 |
| Example 2 | 0.04 | 0.08 | 0.0306:1 | 0.0555:1 | 0.0163:1 | 0.0297:1 |
| Example 3 | 0.08 | 0.04 | 0.0206:1 | 0.0634:1 | 0.011:1 | 0.0338:1 |
| Example 4 | 0.10 | 0.00 | 0.1109:1 | 0.0424:1 | 0.0569:1 | 0.0217:1 |
| Example 5 | 0.04 | 0.00 | 0.0188:1 | 0.0393:1 | 0.0104:1 | 0.0218:1 |
| Example 6 | 0.00 | 0.04 | 0.0271:1 | 0.0406:1 | 0.0145:1 | 0.0218:1 |
| Comp. Example 1 | 0.00 | 0.00 | 0 | 0 | 0 | 0 |
| Comp. Example 2 | 0.01 | 0.00 | 0 | 0 | 0 | 0 |
| Comp. Example 3 | 0.04 | NaCl 0.016 | 0.3405:1 | 0.0349:1 | 0.1608:1 | 0.0165:1 |
| Comp. Example 4-1 | $ZnCl_2$, 0.045 mmol $Al(OH)_2Str$ (Aluminum monostearate) 0.04 mmol | | 0.05:1 | 0.08:1 | 0.04:1 | 0.43:1 |

Without wishing to be bound by any theory, it is believed that the use of sodium chloride may trigger side reactions, whereby an excessive amount of the aluminum may remain, and the film property may be adversely affected.

TABLE 3

| | Diff. Coefficient at 450 nm | Absolute QY(%) | (solution) fwhm (nm) | PL wavelength (nm) |
|---|---|---|---|---|
| Example 1 | 0.001 | 92 | 50 | 500 |
| Example 2 | 0.001 | 90 | 50 | 500 |
| Example 3 | 0.001 | 93 | 51 | 505 |
| Example 4 | 0.001 | 92 | 51 | 505 |
| Example 5 | 0.002 | 91 | 50 | 500 |
| Example 6 | 0.001 | 90 | 51 | 500 |
| Comp. Example 1 | 0.001 | 90 | 55 | 505 |
| Comp. Example 2 | 0.002 | 89 | 53 | 500 |
| Comp. Example 3 | 0.000 | 92 | 57 | 509 |
| Comp. Example 4-1 | −0.005 | 90 | 45 | 530 |
| Comp. Example 4-2 | −0.007 | 87 | 46 | 525 |

TABLE 4

| | CE | QY Loss | FWHM | PL tail |
|---|---|---|---|---|
| Example 1 | 41.4% | 5.4% | 39 nm | 12.1% |
| Example 2 | 41.0% | 5.6% | 39 nm | 11.3% |
| Example 3 | 40.6% | 6.3% | 39 nm | 10.7% |
| Example 4 | 40.6% | 7.1% | 39 nm | 10.3% |
| Example 5 | 40.3% | 8.6% | 40 nm | 11.5% |
| Example 6 | 39.5% | 9.5% | 40 nm | 12.0% |
| Comp. Example 1 | 38.0% | 11.2% | 45 nm | 16.5 |
| Comp. Example 2 | 37.8% | 11.3% | 44 nm | 15.4 |
| Comp. Example 3 | 38.0% | 12.5% | 43 nm | 12.9% |
| Comp. Example 4-1 | 35.0% | 7.5% | 39 nm | 12.0% |
| Comp. Example 4-2 | 32.0% | 6.2% | 38 nm | 11.5% |

Experimental Example 1

For each of the luminescent nanostructures prepared in Examples 1 to 6 and Comparative Example 1, the number of the chlorine atoms per one nanostructure is measured. For each of the luminescent nanostructures prepared in Examples 1 to 6 and Comparative Example 1, an EGA is carried out and the ratio of the oleic acid amount that is measured at about 350° C. or higher to a total amount of the oleic acid on the nanostructures EGA (i.e., the ligand bonding strength ratio) is obtained.

The results of these measurements are shown in Table 5.

TABLE 5

|  | The number of CI per one QD (#) | ligand bonding strength ratio (%) |
|---|---|---|
| Example1 | 84 | 93% |
| Example2 | 60 | 92% |
| Example 3 | 58 | 90% |
| Example 4 | 47 | 89% |
| Example 5 | 46 | 91% |
| Example 6 | 42 | 86% |
| Comp. Example 1 | 0 | 85% |

The results of Table 5 confirm that the luminescent nanostructures of the Examples may exhibit a higher ligand bonding strength ratio than the nanostructures of the comparative example 1.

Experimental Example 2

Figure 8A:
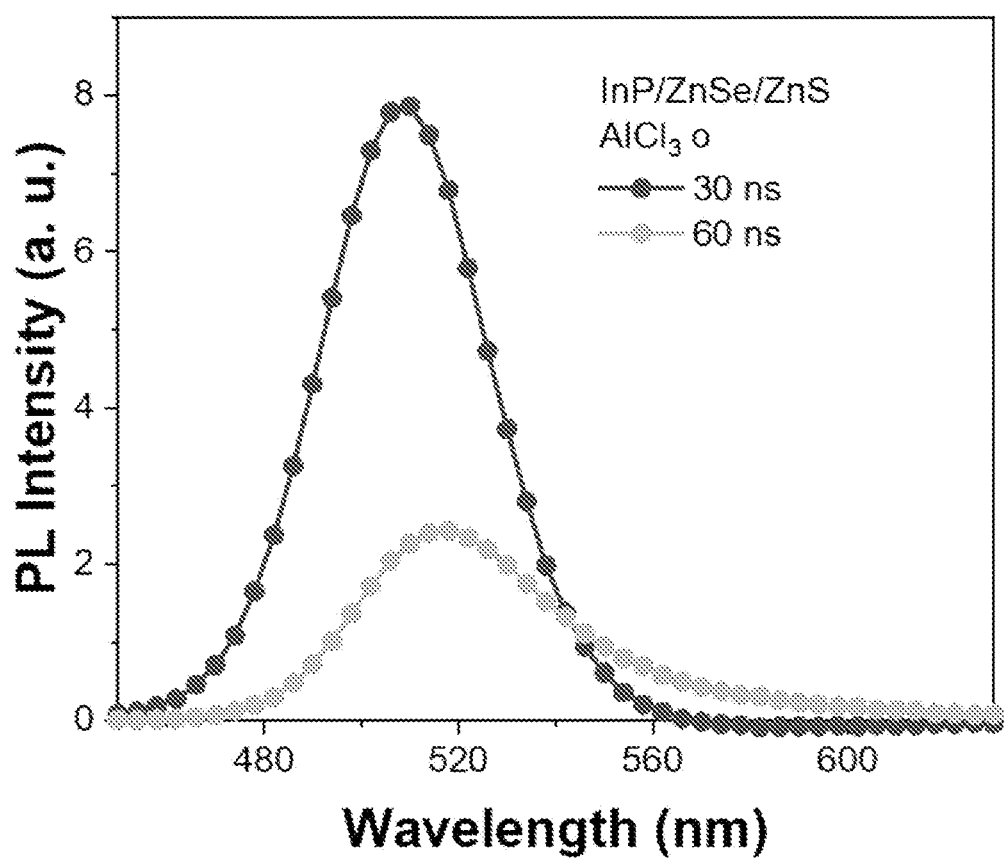
FIG. 8A shows a result of a time resolved photoluminescent spectroscopy analysis for the luminescent nanostructures of Example 1.
Figure 8B:
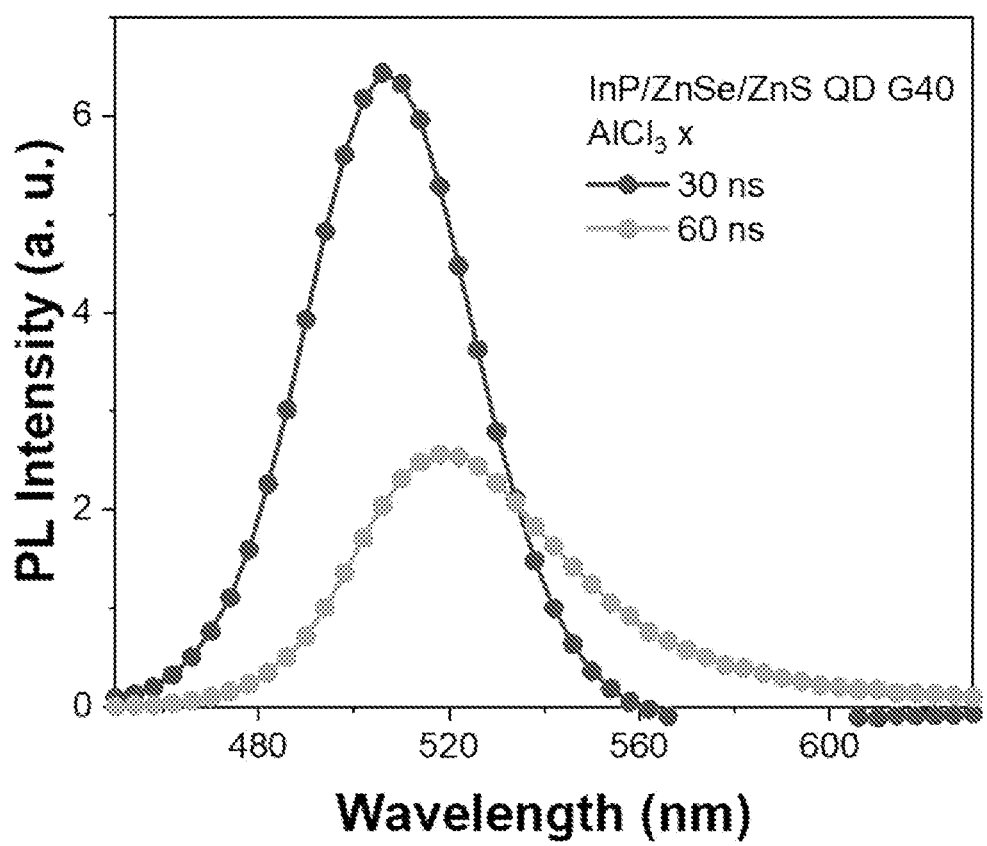
FIG. 8B shows a result of a time resolved photoluminescent spectroscopy analysis for the luminescent nanostructures of comparative Example 1.

For the luminescent nanostructures of Example 1 and the luminescent nanostructures of Comparative Example 1, a time resolved photoluminescent spectroscopy analysis is made and the results are shown in FIG. 8A and FIG. 8B, respectively.

The results of FIG. 8A and FIG. 8B show that the luminescent nanostructures of Example 1 may exhibit a reduced trap emission at 60 ns in comparison with the luminescent nanostructures of Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A color conversion panel comprising:
a color conversion layer including a color conversion region, and optionally, a partition wall defining each region of the color conversion layer,
wherein the color conversion region comprises a first region corresponding to a green pixel, and the first region comprises a first composite that is configured to emit a green light, and includes a matrix and a plurality of luminescent nanostructures dispersed in the matrix,
wherein the plurality of luminescent nanostructures comprises a first semiconductor nanocrystal comprising a Group III-V compound and a second semiconductor nanocrystal comprising a zinc chalcogenide,
the Group III-V compound comprises indium and phosphorus, and optionally, zinc or gallium, or zinc and gallium,
the zinc chalcogenide comprises zinc, selenium, and sulfur,
the luminescent nanostructures do not comprise cadmium,
wherein the luminescent nanostructures further comprise aluminum and chlorine, and
wherein in the luminescent nanostructures, a mole ratio of aluminum to sulfur (Al:S) is less than about 0.15:1, a mole ratio of chlorine to sulfur (Cl:S) is less than about 0.1:1, and a mole ratio of sulfur to selenium (S:Se) is greater than or equal to about 2:1.

2. The color conversion panel of claim 1, wherein a full width at half maximum of a maximum luminescent peak of the green light is less than or equal to about 42 nanometers.

3. The color conversion panel of claim 1, wherein the luminescent nanostructure exhibits an ultraviolet-visible absorption spectrum curve that has a positive differential coefficient value at 450 nanometers.

4. The color conversion panel of claim 1, wherein in an UV-Vis absorption spectrum of the luminescent nanostructure, a valley depth (VD) defined by the following equation is greater than or equal to about 0.2:

$$1-(Abs_{valley}/Abs_{first})=VD$$

wherein, $Abs_{first}$ is an absorption rate at the first absorption peak, and $Abs_{valley}$ is an absorption rate at the lowest point of the valley adjacent to the first absorption peak.

5. The color conversion panel of claim 1, wherein the plurality of the luminescent nanostructures comprises a mole ratio of sulfur to selenium of greater than or equal to about 2.5:1.

6. The color conversion panel of claim 1, wherein in the plurality of the luminescent nanostructures, a mole ratio of sulfur to indium is greater than or equal to about 3:1 and less than or equal to about 20:1, and
a mole ratio of selenium to indium is less than or equal to about 10:1.

7. The color conversion panel of claim 1, wherein in the plurality of the luminescent nanostructures, a mole ratio of zinc to indium is less than or equal to about 30:1.

8. The color conversion panel of claim 1, wherein the first composite exhibits a light conversion efficiency of greater than or equal to about 35%, or an incident light absorption of greater than or equal to about 85%, as defined by the following equations, respectively:

$$[A/(B-B')]\times 100 = \text{light conversion efficiency (\%)}$$

$$[(B-B')/B]\times 100 = \text{incident light absorption (\%)}$$

A: light dose of green light emitted from the composite
B: light dose of an incident light
B': light dose having passed through the first composite.

9. The color conversion panel of claim 1, wherein upon the irradiation of the first composite with incident light of a wavelength of about 450 nm to about 460 nm, the first composite exhibits a QY loss percentage of less than about 11%, wherein the QY loss percentage is defined by the following equation:

$$QY \text{ loss (\%)}=[1-(QY \text{ at } 80°\text{ C.}/QY \text{ at room temperature})]\times 100.$$

QY at 80° C.: a quantum yield of the first composite at 80° C.
QY at room temperature: a quantum yield of the first composite at room temperature.

10. The color conversion panel of claim 1, wherein upon irradiation of the first composite with an incident light at a wavelength of 458 nm, a tail percentage defined by the following equation is less than or equal to about 15%:

$$A \text{ tail percentage (\%)}=[S2/S1]\times 100$$

S1: a total area of a maximum photoluminescent peak of the first composite (or the green light)
S2: an area of the maximum photoluminescent peak of the first composite (or the green light) in a wavelength region of greater than or equal to about 580 nm.

11. A population comprising a plurality of luminescent nanostructures,
  wherein the luminescent nanostructures comprise a first semiconductor nanocrystal including a Group III-V compound and a second semiconductor nanocrystal including a zinc chalcogenide,
  wherein the Group III-V compound comprises indium and phosphorus, and optionally, zinc or gallium, or zinc and gallium,
  the zinc chalcogenide comprises zinc, selenium, and sulfur,
  wherein the luminescent nanostructure do not comprise cadmium,
  wherein the luminescent nanostructures are configured to emit green light,
  wherein the plurality of the luminescent nanostructures comprises a mole ratio of sulfur to selenium of greater than or equal to about 2:1,
  wherein the luminescent nanostructures further include aluminum and chlorine, and in the luminescent nanostructures, a mole ratio of aluminum to sulfur (Al:S) is less than about 0.15:1, and a mole ratio of chlorine to sulfur (Cl:S) is less than about 0.1:1.

12. The population of claim 11, wherein the luminescent nanostructure exhibits an ultraviolet-visible absorption spectrum that has a positive differential coefficient value at 450 nm, and
  an absolute quantum yield of the luminescent nanostructures is greater than or equal to about 84%.

13. The population of claim 11, wherein the luminescent nanostructures comprise a C10 or higher aliphatic carboxylic acid bound to surfaces of the luminescent nanostructures, and a mole ratio of aliphatic carboxylic acid detected at a temperature of greater than or equal to about 350° C. to a total moles of the aliphatic carboxylic acid is greater than or equal to about 0.85:1, as determined by an evolved gas analysis of the luminescent nanostructures.

14. The population of claim 11, wherein a percentage ratio of a maximum peak intensity of a trap emission defined with 60 nanoseconds to a maximum peak intensity of a band-edge emission defined with 30 nanoseconds is less than or equal to about 45% as determined by a time resolved photoluminescent spectroscopy analysis of the luminescent nanostructures.

15. The population of claim 11, wherein the luminescent nanostructures have a core shell structure including a core and a shell disposed on the core,
  wherein the core comprises the first semiconductor nanocrystal,
  wherein the shell comprises the second semiconductor nanocrystal.

16. The population of claim 11, wherein in the luminescent nanostructures,
  a mole ratio of sulfur to selenium is greater than or equal to about 2.5:1,
  a mole ratio of sulfur to indium is greater than or equal to about 3:1 to less than or equal to about 20:1, and
  a mole ratio of selenium to indium is less than or equal to about 10:1.

17. The population of claim 11, wherein in the luminescent nanostructures, a mole ratio of aluminum to sulfur is greater than or equal to about 0.005:1 and less than or equal to about 0.12:1, and a mole ratio of chlorine to sulfur is less than or equal to about 0.08:1.

18. The population of claim 11, wherein the luminescent nanostructures exhibit a full width at half maximum of less than or equal to about 40 nanometers and an absolute quantum yield of greater than or equal to about 90%.

19. An electronic device including the population of claim 11.

20. An ink composition comprising a liquid vehicle; and the population of claim 11.

* * * * *